US012605881B2

(12) United States Patent
Cheng et al.

(10) Patent No.: US 12,605,881 B2
(45) Date of Patent: Apr. 21, 2026

(54) 3D PRINTING DEVICE AND METHOD

(71) Applicant: Triastek, Inc., Nanjing (CN)

(72) Inventors: Senping Cheng, Nanjing (CN);
Xiaoling Li, Dublin, CA (US);
Feihuang Deng, Nanjing (CN); Haohui Lu, Nanjing (CN); Haili Liu, Nanjing (CN); Juan Yao, Nanjing (CN); Xiaofei Wang, Nanjing (CN); Wei Wu, Nanjing (CN)

(73) Assignee: Triastek, Inc., Nanjing (CN)

( * ) Notice: Subject to any disclaimer, the term of this patent is extended or adjusted under 35 U.S.C. 154(b) by 549 days.

(21) Appl. No.: 17/752,729

(22) Filed: May 24, 2022

(65) Prior Publication Data

US 2022/0339857 A1 Oct. 27, 2022

Related U.S. Application Data

(63) Continuation of application No. 16/614,301, filed as application No. PCT/CN2018/086489 on May 11, 2018, now Pat. No. 11,364,674.

(30) Foreign Application Priority Data

May 16, 2017 (CN) .......................... 201710347098.1
Jan. 9, 2018 (WO) ................ PCT/CN2018/071965

(51) Int. Cl.
B29C 64/106 (2017.01)
B29C 64/209 (2017.01)
(Continued)

(52) U.S. Cl.
CPC .......... B29C 64/106 (2017.08); B29C 64/209 (2017.08); B29C 64/232 (2017.08);
(Continued)

(58) Field of Classification Search
CPC ... B29C 64/106; B29C 64/209; B29C 64/232; B29C 64/245; B29C 64/329; B29C 64/336; B29C 64/393; B33Y 30/00
See application file for complete search history.

(56) References Cited

U.S. PATENT DOCUMENTS

| | | | |
|---|---|---|---|
| 3,778,861 A | 12/1973 | Goodnow | |
| 4,750,318 A | 6/1988 | Matsuzawa | |

(Continued)

FOREIGN PATENT DOCUMENTS

| | | | |
|---|---|---|---|
| CN | 1586865 A | 3/2005 | |
| CN | 1872526 A | 12/2006 | |

(Continued)

OTHER PUBLICATIONS

Goyanes, A. et al. (2015). "3D Printing of Medicines: Engineering Novel Oral Devices with Unique Design and Drug Release Characteristics," Molecular Pharmaceutics 12(11):4077-4084, 8 pages.

(Continued)

*Primary Examiner* — Galen H Hauth
*Assistant Examiner* — Mohamed K Ahmed Ali
(74) *Attorney, Agent, or Firm* — MORRISON & FOERSTER LLP

(57) ABSTRACT

A 3D printing device (100), comprising a melt extrusion module (102), a printing module (103), and a platform module (104). The melt extrusion module (102) comprises a processing chamber (121) consisting of a feed inlet (124) and a discharge outlet (125), as well as an extrusion means (122) and a heating means (123) disposed at the processing chamber; the melt extrusion module (102) is configured to receive an initial material from the feed inlet (124) of the processing chamber (121), and heat and extrude the initial material to convert the initial material into a molten body, which is extruded out of the discharge outlet (125) of the (Continued)

processing chamber (121). The printing module (103) is communicated with the discharge outlet (125) of the processing chamber (121) and is provided with a nozzle (131); the printing module (103) is configured to receive the molten body extruded from the discharge outlet (125) of the processing chamber (121) and guide the molten body to be extruded out of the nozzle (131). The platform module (104) is configured to receive the molten body extruded from the nozzle (131).

15 Claims, 16 Drawing Sheets

(51) Int. Cl.

| | |
|---|---|
| *B29C 64/232* | (2017.01) |
| *B29C 64/245* | (2017.01) |
| *B29C 64/329* | (2017.01) |
| *B29C 64/336* | (2017.01) |
| *B29C 64/393* | (2017.01) |
| *B33Y 30/00* | (2015.01) |
| *B33Y 50/02* | (2015.01) |
| *B33Y 10/00* | (2015.01) |

(52) U.S. Cl.
CPC .......... *B29C 64/245* (2017.08); *B29C 64/329* (2017.08); *B29C 64/336* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 5,002,717 A | 3/1991 | Taniguchi | |
| 5,033,251 A | 7/1991 | Rodriguez | |
| 5,121,329 A | 6/1992 | Crump | |
| 5,192,559 A | 3/1993 | Hull | |
| 5,299,907 A | 4/1994 | Dal | |
| 5,303,141 A | 4/1994 | Batchelder | |
| 5,484,062 A | 1/1996 | Rich | |
| 5,529,471 A | 6/1996 | Khoshevis | |
| 5,672,364 A | 9/1997 | Kato | |
| 5,936,861 A | 8/1999 | Jang | |
| 6,571,702 B2 | 6/2003 | Wotton | |
| 6,684,604 B2 | 2/2004 | Luc | |
| 6,986,739 B2 * | 1/2006 | Warren ................... C12M 21/08 |
| | | | 118/683 |
| 8,282,380 B2 | 10/2012 | Pax | |
| 8,342,400 B1 | 1/2013 | Reese | |
| 8,668,859 B2 | 3/2014 | Pettis | |
| 8,827,684 B1 | 9/2014 | Schumacher | |
| 8,926,484 B1 | 1/2015 | Comb et al. | |
| 9,233,491 B2 | 1/2016 | Stuhl | |
| 9,233,506 B2 | 1/2016 | Leavitt | |
| 9,271,897 B2 | 3/2016 | Costello | |
| 9,297,845 B2 | 3/2016 | Mathur | |
| 9,445,971 B2 | 9/2016 | Anderson | |
| 9,610,219 B1 | 4/2017 | Basso | |
| 9,610,733 B2 | 4/2017 | Swanson | |
| 9,944,016 B2 | 4/2018 | Lewicki | |
| 9,952,237 B2 | 4/2018 | Fournier | |
| 9,974,607 B2 | 5/2018 | Stone | |
| 10,011,073 B2 | 7/2018 | Bheda | |
| 10,143,626 B2 | 12/2018 | Li | |
| 10,201,503 B1 | 2/2019 | Li | |
| 10,254,499 B1 | 4/2019 | Cohen et al. | |
| 10,258,575 B2 | 4/2019 | Li | |
| 10,350,822 B1 | 7/2019 | Deng | |
| 10,363,220 B2 | 7/2019 | Li | |
| 10,624,857 B2 | 4/2020 | Li | |
| 10,973,767 B2 | 4/2021 | Li | |
| 11,292,193 B2 | 4/2022 | Liu et al. | |
| 11,364,674 B2 | 6/2022 | Cheng et al. | |
| 11,383,439 B1 | 7/2022 | Liu | |
| 11,458,684 B2 | 10/2022 | Liu et al. | |
| 11,612,569 B2 | 3/2023 | Li et al. | |
| 12,103,231 B2 | 10/2024 | Deng et al. | |
| 12,156,945 B2 | 12/2024 | Li et al. | |
| 12,168,538 B2 | 12/2024 | Wang et al. | |
| 2002/0113331 A1 | 8/2002 | Zhang et al. | |
| 2003/0077347 A1 | 4/2003 | Miebach | |
| 2004/0175450 A1 | 9/2004 | Yanagisawa | |
| 2004/0232601 A1 | 11/2004 | Kundinger | |
| 2004/0253365 A1 | 12/2004 | Warren et al. | |
| 2006/0266188 A1 | 11/2006 | Kim | |
| 2008/0093763 A1 | 4/2008 | Mancosh et al. | |
| 2008/0110134 A1 | 5/2008 | Nitulescu | |
| 2009/0283438 A1 | 11/2009 | Bourque | |
| 2012/0092724 A1 | 4/2012 | Pettis | |
| 2012/0096807 A1 | 4/2012 | Okuma | |
| 2012/0105903 A1 | 5/2012 | Pettis | |
| 2012/0200596 A1 | 8/2012 | Gotou | |
| 2012/0315333 A1 | 12/2012 | Zhou | |
| 2014/0116217 A1 | 5/2014 | Hashish | |
| 2014/0220168 A1 | 8/2014 | Perez | |
| 2015/0035206 A1 | 2/2015 | Maggiore | |
| 2015/0037527 A1 | 2/2015 | Jacobs | |
| 2015/0130101 A1 | 5/2015 | Fiegener | |
| 2015/0210010 A1 | 7/2015 | Napadensky | |
| 2015/0298394 A1 | 10/2015 | Sheinman | |
| 2015/0321419 A1 | 11/2015 | Linthicum et al. | |
| 2015/0352009 A1 | 12/2015 | Miller | |
| 2015/0352787 A1 | 12/2015 | Humbert et al. | |
| 2016/0038655 A1 | 2/2016 | Weisman et al. | |
| 2016/0042151 A1 | 2/2016 | Akdogan | |
| 2016/0074938 A1 | 3/2016 | Kitani et al. | |
| 2016/0075091 A1 | 3/2016 | Cable | |
| 2016/0096321 A1 | 4/2016 | Fry et al. | |
| 2016/0122045 A1 | 5/2016 | Kames | |
| 2016/0136887 A1 | 5/2016 | Guillemette et al. | |
| 2016/0200024 A1 | 7/2016 | Kim et al. | |
| 2016/0288414 A1 | 10/2016 | Ozbolat et al. | |
| 2016/0288427 A1 | 10/2016 | Foley et al. | |
| 2016/0303802 A1 | 10/2016 | Meshorer | |
| 2016/0325498 A1 | 11/2016 | Gelbart | |
| 2016/0354315 A1 | 12/2016 | Li | |
| 2016/0367358 A1 | 12/2016 | Tran | |
| 2017/0008230 A1 | 1/2017 | Yuyama | |
| 2017/0050375 A1 | 2/2017 | Tyler | |
| 2017/0057682 A1 | 3/2017 | Chudy | |
| 2017/0120513 A1 * | 5/2017 | Brennan ................. B29B 7/404 |
| 2017/0121039 A1 | 5/2017 | Ciesiun | |
| 2017/0165920 A1 | 6/2017 | Leavitt et al. | |
| 2017/0217088 A1 * | 8/2017 | Boyd, IV .............. B29C 64/106 |
| 2017/0253354 A1 | 9/2017 | Colson | |
| 2017/0360714 A1 | 12/2017 | Church | |
| 2018/0001565 A1 | 1/2018 | Hocker | |
| 2018/0011306 A1 | 1/2018 | Babnick et al. | |
| 2018/0015730 A1 | 1/2018 | Essien et al. | |
| 2018/0035689 A1 | 2/2018 | Warner et al. | |
| 2018/0049993 A1 | 2/2018 | Blaesi et al. | |
| 2018/0056582 A1 | 3/2018 | Matusik et al. | |
| 2018/0056602 A1 | 3/2018 | Susnjara | |
| 2018/0104911 A1 | 4/2018 | Donaldson | |
| 2018/0110679 A1 | 4/2018 | Devens | |
| 2018/0116911 A1 | 5/2018 | Li | |
| 2018/0133980 A1 * | 5/2018 | Mantell ................. B29C 64/118 |
| 2018/0141685 A1 | 5/2018 | Colson | |
| 2018/0184702 A1 | 7/2018 | Moh | |
| 2018/0194061 A1 | 7/2018 | Takahashi | |
| 2018/0200955 A1 | 7/2018 | Hoelldorfer et al. | |
| 2018/0222111 A1 | 8/2018 | Bayer et al. | |
| 2018/0228737 A1 | 8/2018 | Giridhar et al. | |
| 2018/0235837 A1 | 8/2018 | Klein | |
| 2018/0296494 A1 | 10/2018 | Shalev | |
| 2018/0311167 A1 | 11/2018 | Li | |
| 2018/0318929 A1 | 11/2018 | Matthews | |
| 2018/0319065 A1 | 11/2018 | Holm et al. | |
| 2018/0319519 A1 | 11/2018 | Stange | |
| 2018/0339448 A1 | 11/2018 | Fan | |
| 2018/0339455 A1 | 11/2018 | Cohen | |
| 2018/0370117 A1 * | 12/2018 | Gardiner ............... B33Y 30/00 |

(56)  References Cited

U.S. PATENT DOCUMENTS

| | | |
|---|---|---|
| 2019/0001574 A1 | 1/2019 | Yackabonis |
| 2019/0015344 A1 | 1/2019 | Wening |
| 2019/0022934 A1 | 1/2019 | Kobe et al. |
| 2019/0047225 A1 | 2/2019 | Luo |
| 2019/0125681 A1 | 5/2019 | Albed Alhnan |
| 2019/0192383 A1 | 6/2019 | Schiller |
| 2019/0192440 A1 | 6/2019 | Li |
| 2019/0202126 A1 | 7/2019 | Hutchinson et al. |
| 2019/0209468 A1 | 7/2019 | Deng |
| 2019/0209482 A1 | 7/2019 | Li |
| 2019/0217545 A1 | 7/2019 | Eller et al. |
| 2019/0321299 A1 | 10/2019 | Li |
| 2019/0374471 A1 | 12/2019 | Basit |
| 2020/0016039 A1 | 1/2020 | Boutin |
| 2020/0030491 A1 | 1/2020 | Weisman et al. |
| 2020/0147873 A1 | 5/2020 | Lewis et al. |
| 2020/0315971 A1 | 10/2020 | Li |
| 2020/0338009 A1 | 10/2020 | Li |
| 2020/0369831 A1 | 11/2020 | Herzberger et al. |
| 2020/0394786 A1 | 12/2020 | Yokouchi |
| 2021/0002014 A1 | 1/2021 | Akdogan |
| 2021/0007981 A1 | 1/2021 | Hudson et al. |
| 2021/0039306 A1 | 2/2021 | Busbee |
| 2021/0077410 A1 | 3/2021 | Deng et al. |
| 2021/0078244 A1 | 3/2021 | Deng et al. |
| 2021/0078257 A1 | 3/2021 | Mcnaney |
| 2021/0128479 A1 | 5/2021 | Cheng et al. |
| 2021/0147133 A1 | 5/2021 | Steinweg |
| 2021/0154910 A1 | 5/2021 | Cheng et al. |
| 2021/0178677 A1 | 6/2021 | Liu et al. |
| 2021/0196638 A1 | 7/2021 | Deng et al. |
| 2021/0205226 A1 | 7/2021 | Li |
| 2021/0237361 A1 | 8/2021 | Sasse et al. |
| 2022/0212404 A1 | 7/2022 | Liu et al. |
| 2022/0212408 A1 | 7/2022 | Liu et al. |
| 2023/0048362 A1 | 2/2023 | Liu et al. |
| 2023/0070928 A1 | 3/2023 | Wang et al. |
| 2023/0225978 A1 | 7/2023 | Li et al. |
| 2023/0330925 A1 | 10/2023 | Van et al. |
| 2024/0316864 A1 | 9/2024 | Deng et al. |
| 2025/0042589 A1 | 2/2025 | Wang et al. |
| 2025/0049723 A1 | 2/2025 | Li et al. |
| 2025/0303640 A1 | 10/2025 | Liu et al. |

FOREIGN PATENT DOCUMENTS

| | | |
|---|---|---|
| CN | 203496288 U | 3/2014 |
| CN | 104260349 A | 1/2015 |
| CN | 104552949 A | 4/2015 |
| CN | 204414597 U | 6/2015 |
| CN | 104742375 A | 7/2015 |
| CN | 104924614 A | 9/2015 |
| CN | 204658966 U | 9/2015 |
| CN | 105082539 A | 11/2015 |
| CN | 105313332 A | 2/2016 |
| CN | 105365221 A | 3/2016 |
| CN | 105666640 A | 6/2016 |
| CN | 105711094 A | 6/2016 |
| CN | 205343831 U | 6/2016 |
| CN | 105856562 A | 8/2016 |
| CN | 105965888 A | 9/2016 |
| CN | 106079434 A | 11/2016 |
| CN | 106255583 A | 12/2016 |
| CN | 206047081 U | 3/2017 |
| CN | 106622413 A | 5/2017 |
| CN | 106623936 A | 5/2017 |
| CN | 106626370 A | 5/2017 |
| CN | 106827443 A | 6/2017 |
| CN | 106926444 A | 7/2017 |
| CN | 107019676 A | 8/2017 |
| CN | 206436522 U | 8/2017 |
| CN | 107718560 A | 2/2018 |
| CN | 107877863 A | 4/2018 |
| CN | 108163302 A | 6/2018 |
| CN | 108215153 A | 6/2018 |
| CN | 108215154 A | 6/2018 |
| CN | 207579101 U | 7/2018 |
| CN | 207669820 U | 7/2018 |
| CN | 108568966 A | 9/2018 |
| CN | 108582765 A | 9/2018 |
| CN | 207874876 U | 9/2018 |
| CN | 207901677 U | 9/2018 |
| CN | 109228325 A | 1/2019 |
| CN | 208768826 U | 4/2019 |
| CN | 109719944 A | 5/2019 |
| CN | 208812559 U | 5/2019 |
| CN | 105690762 A | 6/2019 |
| CN | 109895390 A | 6/2019 |
| CN | 109911349 A | 6/2019 |
| CN | 110507637 A | 11/2019 |
| EP | 3626439 A1 | 3/2020 |
| JP | H10305461 A | 11/1998 |
| JP | 2017601066 A | 3/2017 |
| JP | 2018027637 A | 2/2018 |
| KR | 20160107769 A * | 9/2016 |
| KR | 20190031959 A | 3/2019 |
| WO | 2014039825 A2 | 3/2014 |
| WO | 2015065936 A2 | 5/2015 |
| WO | 2015129733 A1 | 9/2015 |
| WO | 2015131833 A1 | 9/2015 |
| WO | 2015171352 A1 | 11/2015 |
| WO | 2016038356 A1 | 3/2016 |
| WO | 2016097911 A1 | 6/2016 |
| WO | 2016126962 A1 | 8/2016 |
| WO | 2016185215 A1 | 11/2016 |
| WO | 2016192680 A1 | 12/2016 |
| WO | 2017008789 A1 | 1/2017 |
| WO | 2017/072536 A1 | 5/2017 |
| WO | 2017113172 A1 | 7/2017 |
| WO | 2017193099 A1 | 11/2017 |
| WO | 2017205443 A1 | 11/2017 |
| WO | 2017206128 A1 | 12/2017 |
| WO | 2018100444 A2 | 6/2018 |
| WO | 2018137686 A1 | 8/2018 |
| WO | 2018210183 A1 | 11/2018 |
| WO | 2019137199 A1 | 7/2019 |
| WO | 2019137200 A1 | 7/2019 |
| WO | 2019137333 A1 | 7/2019 |
| WO | 2021031824 A1 | 2/2021 |
| WO | 2021042865 A1 | 3/2021 |
| WO | 2021164660 A1 | 8/2021 |

OTHER PUBLICATIONS

International Preliminary Report on Patentability, issued Nov. 19, 2019, for PCT Application No. PCT/CN2018/086489, filed May 11, 2018, 1 page. English Translation.

International Search Report and Written Opinion, mailed Aug. 27, 2021, for PCT Application No. PCT/CN2021/098797, filed Jun. 8, 2021, 8 pages.

International Search Report and Written Opinion, mailed Mar. 29, 2019, for PCT/CN2019/070634, filed Jan. 7, 2019, 11 pages.

International Search Report and Written Opinion, mailed May 12, 2021, for PCT/CN2021/076280, filed Feb. 9, 2021, 9 pages.

International Search Report and Written Opinion, mailed Nov. 3, 2020, for PCT/CN2020/105868, filed Jul. 30, 2020, 11 pages.

International Search Report, mailed Jul. 19, 2018, for PCT Application No. PCT/CN2018/086489, filed May 16, 2017, 2 pages. English Translation.

Poh, P.S.P. et al. (Dec. 15, 2016, e-pub. Aug. 1, 2016). "Polylactides in Additive Biomanufacturing," Advanced Drug Delivery Reviews 107:228-246.

Skylar-Scott, M.A. (Nov. 14, 2019, e-pub. Nov. 13, 2019). "Voxelated Soft Matter Via Multimaterial Multinozzle 3D Printing," Nature 575(7782):330-335.

U.S. Appl. No. 16/481,036, for Cheng et al. filed Jul. 25, 2019. (Copy not submitted herewith pursuant to the waiver of 37 C.F.R. § 1.98(a)(2)(iii) issued by the Office on Sep. 21, 2004).

Written Opinion of the International Searching Authority Report, mailed Jul. 19, 2018, for PCT Application No. PCT/CN2018/086489, filed May 11, 2018, 4 pages. English Translation.

(56)                    References Cited

OTHER PUBLICATIONS

Zhang, J. et al. (2017, e-pub. Dec. 23, 2016). "Coupling 3D Printing With Hot-Melt Extrusion to Produce Controlled-Release Tablets," International Journal of Pharmaceutics 519:186-197.
Extended European Search Report, dated Jul. 28, 2025, for European Patent Application No. 25154202.3, 17 pages.
International Preliminary Report on Patentability issued Aug. 23, 2022, for PCT Patent Application No. PCT/CN2021/076280, filed Feb. 9, 2021, 5 pages.
International Preliminary Report on Patentability issued Feb. 17, 2022, for PCT Patent Application No. PCT/CN2020/105868, filed Jul. 30, 2020, 6 pages.
International Preliminary Report on Patentability issued Jan. 10, 2023, for PCT Patent Application No. PCT/CN2021/098797, filed Jun. 8, 2021, 5 pages.
International Preliminary Report on Patentability issued Jul. 14, 2020, for PCT Patent Application No. PCT/CN2019/070634, filed Jan. 7, 2019, 6 pages.

* cited by examiner

990

992

993

991

994

995

997

996

Feed a first initial material to a processing chamber
of a first melt extrusion module

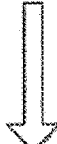

Heat and extrude the first initial material in the
processing chamber, so that the first initial material
is converted into a first melt and the first melt is
extruded from a discharge outlet of the processing
chamber

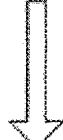

Guide the first melt in the discharge outlet of the
processing chamber to be extruded through a first
nozzle of a first printing module and deposited on
a platform module

FIG. 8

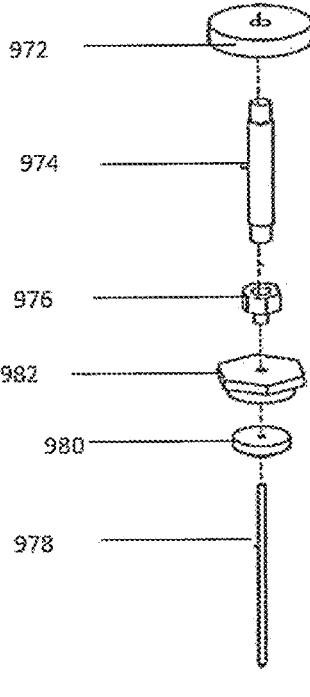
972
974
976
982
980
978
FIG. 9D
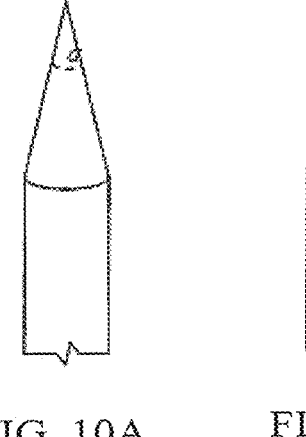
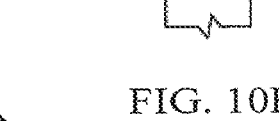
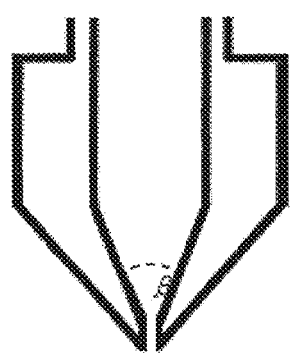
FIG. 10A       FIG. 10B       FIG. 10C 1310b

1312

1310a 1314

1316

1302

1312

1306 1304

1316

3D PRINTING DEVICE AND METHOD

CROSS REFERENCE TO RELATED APPLICATIONS

This application is a continuation application of U.S. Ser. No. 16/614,301, claiming the International filing date of May 11, 2018, which is a national stage application under 35 U.S.C. § 371 of International Application No. PCT/CN2018/086489, filed internationally on May 11, 2018, which claims priority benefit from International Application No. PCT/CN2018/071965, filed internationally on Jan. 9, 2018, and CN201710347098.1, filed May 16, 2017, the entire disclosure of each of which is incorporated herein by reference in its entirety.

FIELD OF THE PRESENT APPLICATION

The present application relates to a device and a method related to an additive manufacturing technology, and in particular, to a 3D printing device and a 3D printing method.

BACKGROUND OF THE PRESENT APPLICATION 3D printing is a rapid prototyping technology. Based on a digital model, 3D printing can be used to manufacture products by using bondable materials, such as metal or plastics, in a layer-by-layer printing manner. With the rapid development of related technologies, 3D printing is widely applied in jewelry, engineering, automobile, dental, aerospace, and medical industries.

Currently, fused deposition modeling (FDM) is currently a common 3D printing technology. Usually, a 3D printing device using this technology heats a filament made of a material, such as ABS or PLA, to reach a temperature slightly higher than a melting temperature, and extrudes a melt in a layer-by-layer manner under the control of a computer or a controller, to stack and build up a required product. Usually, such an existing 3D printing device poses a limitation on the texture of an initial material before melting. For example, usually a material to be fed to a 3D printing device based on the fused deposition modeling technology must be linear or filamentous, and this obviously restricts the application scope of such a 3D printing device. For example, during application of the fused deposition modeling technology in 3D printing of pharmaceuticals, if an drug excipient or an active ingredient of a drug is conveyed in a filamentous form to a printing device, a requirement on the drug loading rate of an initial material needed for 3D printing of the drug cannot be satisfied due to a limitation in the shape of a filamentous material.

Sometimes a powdered raw material is used for 3D printing of pharmaceuticals in practical application. However, because a 3D printing device in industrial application uses a three-dimensional powder-liquid printing technology with powder stratification and adhesive bonding, there may be a problem of powder collection and reclamation caused by stratified spraying of powder. In addition, there are few pharmaceutical dosage forms to which this technology is applicable during 3D printing, and it is difficult for pharmaceutical products printed using this technology to satisfy requirements such as sustained release and zero-order release.

During product manufacturing, especially during manufacturing of a pharmaceutical product, it is desirable to exactly control an amount of material that is dispensed by a nozzle. A major problem of a conventional apparatus for additive manufacturing is unintended leakage of the material through the nozzle, which can cause more than a desired amount of material to be dispensed. The problem becomes more complex when two or more nozzles are used. These nozzles may dispense different materials, which requires alternate switching-on or switching-off. For example, if a first material is leaking from a first nozzle when a second nozzle is dispensing a second material, a manufacturing defect or a material waste arises. As the devices and systems according to the present invention can handle a range of pharmaceutical materials with high accuracy and high precision of material deposition, these devices and systems are very suitable for fabricating pharmaceutical dosage forms with complex geometry and composition. In addition, the devices, systems, and methods according to the present invention are also conducive to personalized medicine, including personalized doses and/or personalized release profiles. Personalized medicine refers to stratification of patients based on biomarkers, to help with therapeutic decision-making and personalized dosage form design. Personalized pharmaceutical dosage forms allow for tailoring an amount of drug to be delivered, including release profiles, based on a patient's mass and metabolism. Pharmaceutical dosage forms manufactured using the devices according to the present invention can ensure accurate dosing for growing children, and permit personalized dosing of highly potent drugs. Personalized pharmaceutical dosage forms can also be used to combine all of patients' medications into a single daily dose, to improve patients' adherence to medication and treatment compliance. It is much easier to modify a digital design than modifying a physical device. Furthermore, automated small-scale three-dimensional printing may have a negligible operating cost. Therefore, the additive manufacturing apparatuses according to the present invention can make multiple small individualized batches become economically feasible and achieve personalized dosage forms designed to improve adherence.

Compared with conventional "batch production" of pharmaceuticals, "continuous production" of pharmaceuticals uses a process analysis technology (PAT) (for example, a near-infrared technology) to provide quality information continuously in real time, so that a final product can be directly launched onto a market. Such a production process greatly improves usage efficiency of manufacturing equipment, and more importantly, improves quality of pharmaceuticals. In addition, as quality inspection is performed continuously during a production process, scraps in batches can be effectively avoided, and storage and transportation costs of an intermediate product are also saved as an intermediate process is spared. It can be predicted that, in the foreseeable future, the "continuous production" manner will probably become a mainstream trend of pharmaceutical production, just like 3D printing of pharmaceuticals. However, "continuous production" requires fully-sealed vacuum feeding to avoid cross contamination, and all inspection work needs to be done during the production process.

SUMMARY OF THE INVENTION

An objective of the present invention is to provide a 3D printing device capable of resolving the foregoing defects and deficiencies.

In one aspect of the present invention, a 3D printing device is provided, including a first melt extrusion module, a first printing module, and a platform module. The first melt extrusion module includes a processing chamber having a feed inlet and a discharge outlet, and an extrusion apparatus and a heating apparatus that are disposed in the processing chamber. The first melt extrusion module is configured to receive a first initial material through the feed inlet of the processing chamber and heat and extrude the first initial material, so that the first initial material is converted into a first melt and the first melt is extruded from the discharge outlet of the processing chamber. The first printing module is connected to the discharge outlet of the processing chamber, and has a first nozzle. The first printing module is configured to receive the first melt extruded from the discharge outlet of the processing chamber and guide the first melt to be extruded through the first nozzle. The platform module is configured to receive the first melt extruded through the first nozzle.

In some embodiments of the present invention, the first printing module is configured to perform melting and pressurization. The first printing module includes a feed channel connected to a printing head, where the printing head includes a nozzle, and the nozzle includes a tapered inner surface and an extrusion port configured to dispense a material; a pressure sensor, where the pressure sensor is configured to measure the pressure of the material within the nozzle or within the feed channel proximal to the nozzle; and a control switch, where the control switch includes a sealing needle operable between an open position and a closed position, the sealing needle extends through a portion of the feed channel and includes a tapered end, and the tapered end of the sealing needle engages with the tapered inner surface of the nozzle, so as to inhibit the material from flowing through the nozzle when the sealing needle is in the closed position.

In one aspect of the present invention, the 3D printing device is configured to deposit a material or manufacture a product (for example, a pharmaceutical dosage form) through additive manufacturing by precisely controlling the pressure in the nozzle or the pressure in the feed channel proximal to the nozzle. When the sealing needle is in the closed position, the control switch equipped with the sealing needle inhibits the material from flowing through the nozzle. The nozzle includes a tapered inner surface, and the sealing needle includes a tapered end, where the tapered end engages with the tapered inner surface of the nozzle to inhibit the material from leaking. The sealing needle is preferably sharp and thin, and free of protrusions, as any protrusion could probably push the material out of the nozzle when the sealing needle is in the closed position. Preferably, the pressure of the material remains approximately constant in the device. The pressure of the material can be controlled by monitoring the pressure and using a feedback system to pressurize the material. In this way, once the sealing needle is positioned in the open position, the material can be immediately extruded at a constant rate without a need to ramp up the pressure. This can further implement exact material dispensing, to allow for precise and accurate manufacturing of a drug dose unit, for example, a pharmaceutical tablet.

In some embodiments of the present invention, any portion of the sealing needle that contacts the material is free of protrusions.

In some embodiments of the present invention, the tapered end of the sealing needle includes a pointed tip. In some embodiments, the tapered end of the sealing needle is frustoconical. In some embodiments, the tapered inner surface of the nozzle has a first taper angle, and the tapered end of the sealing needle has a second taper angle, where the second taper angle is equal to or less than the first taper angle. In some embodiments, the second taper angle is about 60° or less. In some embodiments, the second taper angle is about 45° or less. In some embodiments, a ratio of the first taper angle to the second taper angle is about 1:1 to 4:1.

In some embodiments of the present invention, the extrusion port has a diameter of about 0.1 mm to 1 mm. In some embodiments, the tapered end has a largest diameter of about 0.2 mm to about 3.0 mm. In some embodiments, the extrusion port has a diameter, and the tapered end has a largest diameter, where a ratio of the largest diameter of the tapered end to the diameter of the extrusion port is about 1:0.8 to about 1:0.1.

In some embodiments of the present invention, the control switch includes an actuator, where the actuator can position the sealing needle at the open position or the closed position. In some embodiments, the actuator is a pneumatic actuator. In some embodiments, the actuator is a mechanical actuator.

In some embodiments of the present invention, the sealing needle passes through a gasket fixed at a position relative to the nozzle, where the gasket seals the feed channel.

In some embodiments of the present invention, the tapered end of the sealing needle or the tapered inner surface of the nozzle includes a flexible pad or liner.

In some embodiments of the present invention, the material is non-filamentous. In some embodiments, the material has a viscosity of about 100 Pa·s or more when extruded from the device. In some embodiments, the material has a viscosity of about 400 Pa·s or more when extruded from the device. In some embodiments, the material melts at about 50° C. to 400° C. In some embodiments, the material is extruded from the nozzle at a temperature of about 50° C. to 400° C. In some embodiments, the material is extruded from the nozzle at a temperature of about 90° C. to 300° C.

In some embodiments of the present invention, the 3D printing device further includes a first feeding module. The first feeding module includes a hopper, and the hopper has an feed inlet and a discharge outlet, and is configured to receive the first initial material through the feed inlet of the hopper and discharge the first initial material to the feed inlet of the processing chamber of the first melt extrusion module through the discharge outlet of the hopper.

In some embodiments of the present invention, the 3D printing device further includes a control module. The control module includes a computerized controller, configured to control the 3D printing device based on a status parameter of the 3D printing device.

In some embodiments of the present invention, the 3D printing device further includes a first temperature measurement apparatus communicatively connected to the control module. The first temperature measurement apparatus is configured to measure the temperature of the first melt in the processing chamber and transmit a first temperature measurement signal to the control module.

In some embodiments of the present invention, the heating apparatus of the processing chamber is communicatively connected to the control module, and the control module controls heating power of the heating apparatus of the processing chamber according to the first temperature measurement signal.

In some embodiments of the present invention, the extrusion apparatus is communicatively connected to the control module, and the control module controls extrusion power of the extrusion apparatus according to the first temperature measurement signal.

In some embodiments of the present invention, the extrusion apparatus includes a screw. The screw is disposed in the processing chamber, to extrude the first initial material or the first melt and convey the first melt to the discharge outlet of the processing chamber.

In some embodiments of the present invention, the screw extruder is a single screw extruder, or twin screw extruder, or a combination thereof.

In some embodiments of the present invention, the first melt extrusion module includes a melt extrusion discharge control apparatus, and the melt extrusion discharge control apparatus is configured to control the discharge speed of the first melt at the discharge outlet of the processing chamber.

In some embodiments of the present invention, the 3D printing device further includes: a first pressure measurement apparatus, where the first pressure measurement apparatus is communicatively connected to the control module, and configured to measure the pressure of the first melt in the first printing module and transmit a first pressure measurement signal to the control module; and a pressure regulating apparatus, where the pressure regulating apparatus is disposed in the first printing module, and configured to regulate the pressure of the first melt in the first printing module, and the control module is communicatively connected to the pressure regulating apparatus, and regulates the pressure of the first melt in the first printing module by using the pressure regulating apparatus according to the first pressure measurement signal.

In some embodiments of the present invention, the pressure sensor is connected to a computer system that controls the first printing module in response to the pressure reported by the pressure sensor and pressurizes the material to a required pressure. In some embodiments, the pressure of the material is within 0.05 MPa of the required pressure. In some embodiments, the first printing module includes a piston and a barrel that is connected to the feed channel, where the piston is driven to control the pressure of a material in the barrel. In some embodiments, the piston is driven by a stepper motor.

In some embodiments of the present invention, the 3D printing device further includes: a second temperature measurement apparatus, where the second temperature measurement apparatus is communicatively connected to the control module, and configured to measure the temperature of the first melt in the first printing module and transmit a second temperature measurement signal to the control module; and a temperature regulating apparatus, where the temperature regulating apparatus is disposed in the first printing module, and configured to regulate the temperature of the first melt in the first printing module, and the control module is communicatively connected to the temperature regulating apparatus, and regulates the temperature of the first melt in the first printing module through the temperature regulating apparatus according to the second temperature measurement signal. In some embodiments, the second temperature measurement apparatus is connected to a computer system, and the computer system controls a corresponding temperature regulating apparatus according to the temperature monitored by the second temperature measurement apparatus.

The present invention provides a more precise system, configured to deposit a material or manufacture a product (for example, a pharmaceutical dosage form) through additive manufacturing by precisely controlling the pressure of the nozzle or the pressure of the feed channel proximal to the nozzle. When the sealing needle is in the closed position, the control switch equipped with the sealing needle inhibits the material from flowing through the nozzle. The nozzle includes a tapered inner surface, and the sealing needle includes a tapered end, where the tapered end engages with the tapered inner surface of the nozzle to inhibit the material from leaking. The sealing needle is preferably sharp and thin, and free of protrusions, as any protrusion could probably push the material out of the nozzle when the sealing needle is in the closed position. Preferably, the pressure of the material remains approximately constant in the device. The pressure of the material can be controlled by monitoring the pressure and using a feedback system to pressurize the material. In this way, once the sealing needle is positioned in the open position, the material can be immediately extruded at a constant rate without a need to ramp up the pressure. This can further implement exact material dispensing, to allow for precise and accurate manufacturing of a drug dose unit, for example, a pharmaceutical tablet.

In some embodiments of the present invention, the first feeding module further includes a hopper discharge control apparatus, and the hopper discharge control apparatus is configured to control the discharge speed of the first initial material at the discharge outlet of the hopper.

In some embodiments of the present invention, the hopper discharge control apparatus is a screw, and the screw is disposed in the hopper and controls the discharge speed of the first initial material at the discharge outlet of the hopper by changing the rotational speed of the screw.

In some embodiments of the present invention, the 3D printing device further includes: a second feeding module, configured to receive a second initial material through a feed inlet of a hopper of the second feeding module and discharge the second initial material through a discharge outlet of the hopper of the second feeding module.

In some embodiments of the present invention, the 3D printing device further includes: a first composition measurement apparatus, where the first composition measurement apparatus is communicatively connected to the control module, and configured to measure a composition of the first melt at any position of the 3D printing device and transmit a first composition measurement signal to the control module; and the hopper discharge control apparatus of the first feeding module and a hopper discharge control apparatus of the second feeding module are communicatively connected to the control module, so that the control module controls, according to the first composition measurement signal, the discharge speed of the first initial material at the discharge outlet of the hopper of the first feeding module and the discharge speed of the second initial material at the discharge outlet of the hopper of the second feeding module respectively through the hopper discharge control apparatus of the first feeding module and the hopper discharge control apparatus of the second feeding module.

In some embodiments of the present invention, the 3D printing device further includes: a first temporary storage module, where the first temporary storage module includes a storage chamber having a feed inlet and a discharge outlet, the feed inlet of the storage chamber is connected to the discharge outlet of the processing chamber, the discharge outlet of the storage chamber is connected to the first printing module, and the first temporary storage module is configured to receive the first melt extruded from the discharge outlet of the processing chamber and guide the first melt to enter the first printing module through the discharge outlet of the storage chamber.

In some embodiments of the present invention, the first temporary storage module further includes a storage chamber discharge control apparatus, configured to control the discharge speed of the first melt at the discharge outlet of the storage chamber.

In some embodiments of the present invention, the first temporary storage module further includes a storage chamber heating apparatus, and the storage chamber heating apparatus is configured to heat the first melt in the storage chamber.

In some embodiments of the present invention, the 3D printing device further includes: a third temperature measurement apparatus, where the third temperature measurement apparatus is communicatively connected to the control module, and configured to measure the temperature of the first melt in the storage chamber and transmit a third temperature measurement signal to the control module; and the control module controls heating power of the storage chamber heating apparatus according to the third temperature measurement signal.

In some embodiments of the present invention, the 3D printing device further includes: a volume measurement apparatus, where the volume measurement apparatus is communicatively connected to the control module, and configured to measure a remaining volume of the storage chamber and transmit a volume measurement signal to the control module.

In some embodiments of the present invention, the first melt extrusion module further includes: a melt extrusion discharge control apparatus, configured to control the discharge speed of the first melt at the discharge outlet of the processing chamber; and the melt extrusion discharge control apparatus is communicatively connected to the control module, and the control module controls the discharge speed of the first melt at the discharge outlet of the processing chamber through the melt extrusion discharge control apparatus according to the volume measurement signal.

In some embodiments of the present invention, the 3D printing device further includes: a backflow channel, where the backflow channel is configured to guide at least a part of the first melt extruded from the discharge outlet of the processing chamber to flow back to the processing chamber.

In some embodiments of the present invention, the 3D printing device further includes: a second feeding module, where the second feeding module includes a hopper having a feed inlet and a discharge outlet, and is configured to receive a second initial material through the feed inlet of the hopper and discharge the second initial material; a second melt extrusion module, where the second melt extrusion module includes a processing chamber having a feed inlet and a discharge outlet, and an extrusion apparatus and a processing chamber heating apparatus that are disposed in the processing chamber, and is configured to receive the second initial material through the feed inlet of the processing chamber of the second melt extrusion module and heat and extrude the second initial material, so that the second initial material is converted into a second melt and the second melt is extruded from the discharge outlet of the processing chamber of the second melt extrusion module; and a first mixing module, where the first mixing module includes a mixing chamber having a feed inlet and a discharge outlet, the feed inlet of the mixing chamber is connected to both the discharge outlet of the processing chamber of the first melt extrusion module and the discharge outlet of the processing chamber of the second melt extrusion module, the discharge outlet of the mixing chamber is connected to the first printing module, and the first mixing module is configured to receive the extruded first melt and second melt, mix them into a first mixed melt, and guide the first mixed melt to enter the first printing module.

In some embodiments of the present invention, the first melt extrusion module and the second melt extrusion module respectively include melt extrusion discharge control apparatuses, respectively configured to control the discharge speed of the first melt at the discharge outlet of the processing chamber of the first melt extrusion module and the discharge speed of the second melt at the discharge outlet of the processing chamber of the second melt extrusion module.

In some embodiments of the present invention, the 3D printing device further includes: a second composition measurement apparatus, where the second composition measurement apparatus is communicatively connected to the control module, and configured to measure a composition of the first mixed melt extruded from the discharge outlet of the mixing chamber and transmit a second composition measurement signal to the control module; and the melt extrusion discharge control apparatus of the first melt extrusion module and the melt extrusion discharge control apparatus of the second melt extrusion module are communicatively connected to the control module, so that the control module controls, according to the second composition measurement signal, the discharge speed of the first melt at the discharge outlet of the processing chamber of the first melt extrusion module and the discharge speed of the second melt at the discharge outlet of the processing chamber of the second melt extrusion module respectively through the melt extrusion discharge control apparatus of the first melt extrusion module and the melt extrusion discharge control apparatus of the second melt extrusion module.

In some embodiments of the present invention, the first mixing module further includes a mixing chamber heating apparatus, and the mixing chamber heating apparatus is configured to heat the first mixed melt in the mixing chamber.

In some embodiments of the present invention, the 3D printing device further includes: a fourth temperature measurement apparatus, where the fourth temperature measurement apparatus is communicatively connected to the control module, and configured to measure the temperature of the first mixed melt in the mixing chamber and transmit a fourth temperature measurement signal to the control module; and the control module controls heating power of the mixing chamber heating apparatus according to the fourth temperature measurement signal.

In some embodiments of the present invention, the first mixing module further includes a mixing chamber discharge control apparatus, configured to control the discharge speed of the first mixed melt at the discharge outlet of the mixing chamber.

In some embodiments of the present invention, an inner diameter of the first nozzle is 0.05 mm to 2 mm.

In some embodiments of the present invention, the first printing module further includes a second nozzle.

In some embodiments of the present invention, a length of a connection path from the first nozzle to the discharge outlet of the processing chamber is equal to a length of a connection path from the second nozzle to the discharge outlet of the processing chamber.

In some embodiments of the present invention, the nozzle apparatus includes a plurality of nozzles, and the nozzles are arranged in an array.

In some embodiments of the present invention, the 3D printing device further includes: a printing module driving mechanism, where the printing module driving mechanism is configured to drive the first nozzle of the first printing module to move relative to the platform module.

In some embodiments of the present invention, the printing module driving mechanism is configured to drive the first nozzle of the first printing module to move along a Z-axis of a Cartesian coordinate system relative to the platform module.

In some embodiments of the present invention, the platform module includes: a first deposition platform, where the first deposition platform is configured to receive the first melt extruded through the first nozzle; and a platform driving mechanism, where the platform driving mechanism drives the first deposition platform to move relative to the first nozzle of the first printing module.

In some embodiments of the present invention, the platform driving mechanism is configured to drive the first deposition platform to move along an X-axis and/or a Y-axis of a Cartesian coordinate system relative to the first nozzle.

In some embodiments of the present invention, the 3D printing device further includes: a second melt extrusion module, where the second melt extrusion module includes a processing chamber having a feed inlet and a discharge outlet, and an extrusion apparatus and a processing chamber heating apparatus that are disposed in the processing chamber, and is configured to receive a second initial material through the feed inlet of the processing chamber and heat and extrude the second initial material, so that the second initial material is converted into a second melt and the second melt is extruded from the discharge outlet of the processing chamber; the first printing module further includes a second nozzle, the second nozzle is connected to the discharge outlet of the processing chamber of the second melt extrusion module, and the first printing module is configured to receive the second melt extruded from the discharge outlet of the processing chamber of the second melt extrusion module and guide the second melt to be extruded through the second nozzle; and the platform driving mechanism drives the first deposition platform to move between a position below the first nozzle and a position below the second nozzle.

In some embodiments of the present invention, the platform module further includes: a second deposition platform, where the second deposition platform is configured to receive the first melt extruded through the first nozzle; and the platform driving mechanism drives the first deposition platform and the second deposition platform to pass below the first nozzle in turn.

In some embodiments of the present invention, the 3D printing device further includes a product collection module, where the product collection module is configured to collect a final product formed on the platform module.

In some embodiments of the present invention, the 3D printing device further includes an inspection module, where the inspection module is configured to measure a product parameter of a final product formed on the platform module.

In some embodiments of the present invention, the 3D printing device further includes an automatic screening module, where the automatic screening module is configured to pick a final product formed on the platform module.

In some embodiments of the present invention, the 3D printing device further includes an automatic conveyance module, where the automatic conveyance module is configured to convey the first initial material to the first feeding module.

In some embodiments of the present invention, all of the foregoing interconnected parts are connected through hoses.

In some embodiments of the present invention, inner diameters of the hoses are 1 mm to 100 mm.

In some embodiments of the present invention, the first initial material includes a thermoplastic material.

In some embodiments of the present invention, the 3D printing device further includes a second printing module, where the second printing module is located above the first printing module along a Z-axis of a Cartesian coordinate system.

In some embodiments of the present invention, the 3D printing device further includes a plurality of the foregoing devices, where each printing module is equipped with a control switch. In some embodiments, the system includes a first device loaded with a first material and a second device loaded with a second material, where the first material is different from the second material. In some embodiments, the system includes a computer system, where the computer system includes one or more processors and a computer readable memory, and the computer system is configured to control the system. In some embodiments of the present invention, the computer readable memory stores an instruction for printing a product by using the system. In some embodiments of the present invention, the computer readable memory stores an instruction for controlling the pressure of a material in each printing module in response to a pressure measured by a pressure sensor of the corresponding printing module. In some embodiments of the present invention, the computer readable memory stores an instruction for controlling the temperature of a material in each printing module in response to a temperature measured by a temperature sensor of the corresponding printing module.

In another aspect of the present invention, a 3D printing method is provided. The 3D printing method includes: feeding a first initial material to a processing chamber of a first melt extrusion module; heating and extruding the first initial material in the processing chamber, so that the first initial material is converted into a first melt and the first melt is extruded from a discharge outlet of the processing chamber; and guiding the first melt at the discharge outlet of the processing chamber to be extruded through a first nozzle of a first printing module and deposited on a platform module.

In some embodiments of the present invention, the 3D printing method further includes: feeding the first initial material to the first melt extrusion module through a hopper of a first feeding module.

In some embodiments of the present invention, the 3D printing method further includes: measuring the pressure of the first melt in the first printing module; and controlling the pressure of the first melt in the first printing module according to the measured pressure. In some embodiments of the present invention, the method controls, by using a feedback system, the pressure of the first melt based on the monitored pressure.

In some embodiments of the present invention, the pressure of the first melt in the nozzle remains approximately constant.

In some embodiments of the present invention, the 3D printing method further includes: measuring the temperature of the first melt in the first printing module; and regulating the temperature of the first melt in the first printing module according to the measured temperature. In some embodiments of the present invention, the method controls, by using a feedback system, the temperature of the first melt based on the monitored temperature.

In some embodiments of the present invention, the temperature of the first melt in the nozzle remains approximately constant.

In some embodiments of the present invention, the step of guiding the first melt at the discharge outlet of the processing chamber to be extruded through the first nozzle of the first printing module and deposited on the platform module includes: making the first melt flow through an extrusion port of the nozzle, where the nozzle includes a tapered inner surface; making a tapered end of a sealing needle engage with the tapered inner surface of the nozzle, to seal the extrusion port and inhibit flowing of the first melt; and withdrawing the tapered end of the sealing needle, to resume flowing of the first melt through the extrusion port.

In some embodiments of the present invention, the first melt includes a pharmaceutically acceptable material. In some embodiments, the first melt includes a drug. In some embodiments, the method includes: receiving an instruction for manufacturing a pharmaceutical dosage form.

In some embodiments of the present invention, the material is non-filamentous. In some embodiments, the material has a viscosity of about 100 Pa·s or more.

In some embodiments of the present invention, any portion of the sealing needle that contacts the material is free of protrusions.

In some embodiments of the present invention, the tapered end of the sealing needle includes a sharp pointed tip. In some embodiments, the tapered end of the sealing needle is frustoconical. In some embodiments, the tapered inner surface of the nozzle has a first taper angle, and the tapered end of the sealing needle has a second taper angle, where the second taper angle is equal to or less than the first taper angle. In some embodiments, the second taper angle is about 60° or less. In some embodiments, the second taper angle is about 45° or less. In some embodiments, a ratio of the first taper angle to the second taper angle is about 1:1 to 4:1. In some embodiments, the extrusion port has a diameter of about 0.1 mm to 1 mm. In some embodiments, the tapered end has a largest diameter of about 0.2 mm to about 3.0 mm. In some embodiments, the extrusion port has a diameter, and the tapered end has a largest diameter, where a ratio of the largest diameter of the tapered end to the diameter of the extrusion port is about 1:0.8 to about 1:0.1.

In some embodiments of the present invention, the method controls, by using a feedback system, the pressure of the first melt based on the monitored pressure. In some embodiments of the present invention, the pressure of the first melt in the nozzle remains approximately constant.

In some embodiments of the present invention, the method controls, by using a feedback system, the temperature of the first melt based on the monitored temperature. In some embodiments of the present invention, the temperature of the first melt in the nozzle remains approximately constant. In some embodiments of the present invention, the 3D printing method further includes: measuring the temperature of the first melt in the processing chamber; and controlling heating power and/or extrusion power for the first melt or the first initial material in the processing chamber according to the measured temperature.

In some embodiments of the present invention, the step of guiding the first melt at the discharge outlet of the processing chamber to be extruded through the first nozzle of the first printing module and deposited on the platform module includes: guiding the first melt at the discharge outlet of the processing chamber to enter a storage chamber of a first temporary storage module; and guiding the first melt at a discharge outlet of the storage chamber to be extruded through the first nozzle of the first printing module and deposited on the platform module. In some embodiments of the present invention, the 3D printing method further includes: measuring the temperature of the first melt in the storage chamber; and controlling heating power for the first melt in the storage chamber according to the measured temperature.

In some embodiments of the present invention, the 3D printing method further includes: measuring a remaining volume of the storage chamber; and controlling the discharge speed of the first melt at the discharge outlet of the processing chamber according to the remaining volume of the storage chamber.

In some embodiments of the present invention, the 3D printing method further includes: guiding at least a part of the first melt extruded from the discharge outlet of the processing chamber to flow back to the processing chamber.

In some embodiments of the present invention, the 3D printing method further includes: feeding a second initial material to a processing chamber of a second melt extrusion module through a hopper of a second feeding module; heating and extruding the second initial material in the processing chamber of the second melt extrusion module, so that the second initial material is converted into a second melt and the second melt is extruded from a discharge outlet of the processing chamber of the second melt extrusion module; mixing the first melt and the second melt in a mixing chamber, to form a first mixed melt; and guiding the first mixed melt at a discharge outlet of the mixing chamber to be extruded through the first nozzle of the first printing module and deposited on the platform module.

In some embodiments of the present invention, the 3D printing method further includes: measuring a composition of the first mixed melt extruded from the discharge outlet of the mixing chamber; and controlling the discharge speed of the first melt at the discharge outlet of the processing chamber of the first melt extrusion module and the discharge speed of the second melt at the discharge outlet of the processing chamber of the second melt extrusion module respectively according to the measured composition of the first mixed melt.

In some embodiments of the present invention, the 3D printing method further includes: measuring the temperature of the first mixed melt in the mixing chamber; and controlling heating power for the first mixed melt in the mixing chamber according to the measured temperature.

In some embodiments of the present invention, the 3D printing method further includes: feeding a second initial material to the processing chamber of the first melt extrusion module through a hopper of a second feeding module; and heating and extruding the first initial material and the second initial material in the processing chamber, so that they are converted into a first melt.

In some embodiments of the present invention, the 3D printing method further includes: measuring a composition of the first melt at any position of a 3D printing device, and controlling the discharge speed of the first initial material at a discharge outlet of the first feeding module and the discharge speed of the second initial material at a discharge outlet of the second feeding module respectively according to the measured composition of the first melt.

In some embodiments of the present invention, the 3D printing method further includes: feeding a second initial material to a processing chamber of a second melt extrusion module through a hopper of a second feeding module; and heating and extruding the second initial material in the processing chamber of the second melt extrusion module, so that the second initial material is converted into a second melt and the second melt is extruded from a discharge outlet of the processing chamber of the second melt extrusion module; guiding the second melt at the discharge outlet of the processing chamber of the second melt extrusion module to be extruded through a second nozzle of the first printing module and deposited on the platform module; and driving the platform module to move between a position below the first nozzle and a position below the second nozzle.

In some embodiments of the present invention, the 3D printing method further includes: monitoring the pressure of the first melt within the first nozzle or proximal to the first nozzle; or monitoring the pressure of the second melt in the second nozzle or proximal to the second nozzle. In some embodiments, the pressure of the first melt in the first nozzle or the pressure of the second melt in the second nozzle remains approximately constant. In some embodiments, the method includes: controlling, by using a feedback system, the pressure of the first melt or the second melt based on the monitored pressure.

In some embodiments of the foregoing method, the first melt or the second melt has a viscosity of about 100 Pa·s or higher.

In some embodiments of the present invention, the first initial material or the second initial material is non-filamentous.

In some embodiments of the present invention, any portion of a first sealing needle that contacts the first melt or any portion of a second sealing needle that contacts the second melt is free of protrusions.

In some embodiments of the present invention, the temperature of the first melt in the first nozzle or the temperature of the second melt in the second nozzle remains approximately constant. In some embodiments, the method includes: monitoring the temperature of the first melt or the temperature of the second melt. In some embodiments, the method includes: controlling, by using a feedback system, the temperature of the first melt based on the monitored temperature of the first melt; or controlling, by using a feedback system, the temperature of the second melt based on the monitored temperature of the second melt.

In some embodiments of the present invention, a tapered end of the first sealing needle or a tapered end of the second sealing needle includes a pointed tip. In some embodiments of the foregoing method, the tapered end of the first sealing needle or the tapered end of the second sealing needle is frustoconical.

In some embodiments of the present invention, the tapered inner surface of the first nozzle has a first taper angle, and the tapered end of the first sealing needle has a second taper angle, where the second taper angle is equal to or less than the first taper angle; or a tapered inner surface of the second nozzle has a third taper angle, and the tapered end of the second sealing needle has a fourth taper angle, where the fourth taper angle is equal to or less than the third taper angle. In some embodiments of the present invention, the fourth taper angle is about 60° or less. In some embodiments of the present invention, the second taper angle or the fourth taper angle is about 45° or less. In some embodiments of the present invention, a ratio of the first taper angle to the second taper angle or a ratio of the third taper angle to the fourth taper angle is about 1:1 to about 4:1. In some embodiments of the present invention, a first extrusion port or a second extrusion port has a diameter of about 0.1 mm to about 1 mm. In some embodiments of the present invention, the tapered end of the first sealing needle or the tapered end of the second sealing needle has a largest diameter of about 0.2 mm to about 3.0 mm. In some embodiments of the present invention, the 3D printing method further includes: driving the first nozzle of the first printing module to move relative to the platform module.

In some embodiments of the present invention, the 3D printing method further includes: driving the first nozzle of the first printing module to move along a Z-axis of a Cartesian coordinate system relative to the platform module.

In some embodiments of the present invention, the 3D printing method further includes: driving a first deposition platform of the platform module to move relative to the first nozzle of the first printing module, where the first deposition platform is configured to receive the first melt extruded through the first nozzle.

In some embodiments of the present invention, the 3D printing method further includes: driving the first deposition platform to move along an X-axis and/or a Y-axis of a Cartesian coordinate system relative to the first nozzle.

In some embodiments of the present invention, the 3D printing method further includes: collecting a final product formed on the platform module.

In some embodiments of the present invention, the 3D printing method further includes: measuring a product parameter of a final product formed on the platform module.

In some embodiments of the present invention, the 3D printing method further includes: picking a final product formed on the platform module.

In some embodiments of the present invention, the 3D printing method further includes: conveying the first initial material to the first feeding module through an automatic conveyance module.

In some embodiments of the present invention, the first initial material includes a thermoplastic material.

In another aspect of the present invention, a printing module used in a 3D printing device is provided. The printing module includes n×m nozzles arranged in an array (both n and m are integers greater than or equal to 2), where a position of a nozzle (x, y) is in an $x^{th}$ column and a $y^{th}$ row ($1 \leq x \leq n$, and $1 \leq y \leq m$).

In some embodiments of the present invention, the printing module is constructed to be capable of extruding m types of melt, and the nozzle (x, y) is constructed to be capable of extruding a $y^{th}$ type of melt.

In some embodiments of the present invention, the n×m nozzles are respectively connected to n×m processing chambers.

In some embodiments of the present invention, the discharge speeds of the n×m nozzles are respectively controlled by n×m melt extrusion discharge control apparatuses.

In some embodiments of the present invention, nozzles in the $y^{th}$ row of the n×m nozzles are configured to have almost a same discharge speed. In another aspect of the present invention, a 3D printing method is provided. The 3D printing method includes: melting and pressurizing a material; making the material flow through an extrusion port of a nozzle, where the nozzle includes a tapered inner surface; monitoring the pressure of the material in the nozzle or close to the nozzle; making a tapered end of a sealing needle engage with the tapered inner surface of the nozzle, to seal the extrusion port and inhibit flowing of the melted material; and withdrawing the tapered end of the sealing needle, to resume flowing of the material through the extrusion port. In some embodiments, the method includes: receiving an instruction for manufacturing a product.

In some embodiments of the present invention, the 3D printing method further includes: melting and pressurizing a first material; making the first material flow through a first extrusion port of a first nozzle that includes a tapered inner surface; making a tapered end of a first sealing needle engage with the tapered inner surface of the first nozzle, to seal the first extrusion port and inhibit flowing of the melted first material; melting and pressurizing a second material; and withdrawing a tapered end of a second sealing needle from a tapered inner surface of a second nozzle, so that the second material flows through a second extrusion port. In some embodiments of the present invention, the method includes: receiving an instruction for manufacturing a product.

In another aspect, a method for manufacturing a pharmaceutical dosage form through 3D printing is provided. The method includes: melting and pressurizing a first pharmaceutical material; making the first pharmaceutical material flow through a first extrusion port of a first nozzle that includes a tapered inner surface; making a tapered end of a first sealing needle engage with the tapered inner surface of the first nozzle, to seal the first extrusion port and inhibit flowing of the melted first pharmaceutical material; melting and pressurizing a second pharmaceutical material; and withdrawing a tapered end of a second sealing needle from a tapered inner surface of a second nozzle, so that the second pharmaceutical material flows through a second extrusion port. In some embodiments of the present invention, the first pharmaceutical material or the second pharmaceutical material is an erodible material. In some embodiments of the present invention, the first pharmaceutical material or the second pharmaceutical material includes a drug. In some embodiments, a pharmaceutical dosage form has a specific drug release profile. In some embodiments of the present invention, the method further includes: receiving a control instruction for manufacturing a pharmaceutical dosage form.

In some embodiments of the present invention, a product or a pharmaceutical dosage form is manufactured in batches. In some embodiments of the foregoing methods, a product or a pharmaceutical dosage form is manufactured in a continuous mode.

The present invention further provides a product or pharmaceutical dosage form manufactured according to any one of the foregoing methods.

BRIEF DESCRIPTION OF THE DRAWINGS

The following details described with reference to the accompanying drawings and the appended claims will facilitate a clearer understanding of the foregoing and other features of the present application. It should be understood that, the accompanying drawings of the present application merely show some embodiments of the present invention, and therefore shall not be construed as any limitation on the scope of the present invention. Unless otherwise stated, the accompanying drawings are not necessarily proportional and similar labels generally represent similar parts.

FIG. 8 illustrates a flowchart of a 3D printing method according to a particular embodiment of the present invention.

FIG. 9D illustrates an exploded view of components of a pneumatic actuator configured to control a sealing needle according to another embodiment of the present invention.

FIGS. 10A-10C illustrate an enlarged view of a sealing needle and an extrusion port according to another embodiment of the present invention.

DETAILED DESCRIPTION OF THE INVENTION

The following detailed description is given with reference to the accompanying drawings, which are a part of this specification. In the accompanying drawings, similar symbols generally represent similar parts unless otherwise stated. The detailed description, the accompanying drawings, and illustrative embodiments described in the claims are not intended for limitation. Other embodiments may be used and other changes may be made without departing from the spirit or scope of the subject matter of the present application. It may be understood that, for various aspects of the content generally described herein and illustrated in the accompanying drawings, a plurality of configurations, replacements, combinations, and designs with different composition may be made, and all these explicitly constitute a part of the content of the present invention.

Figure 1:
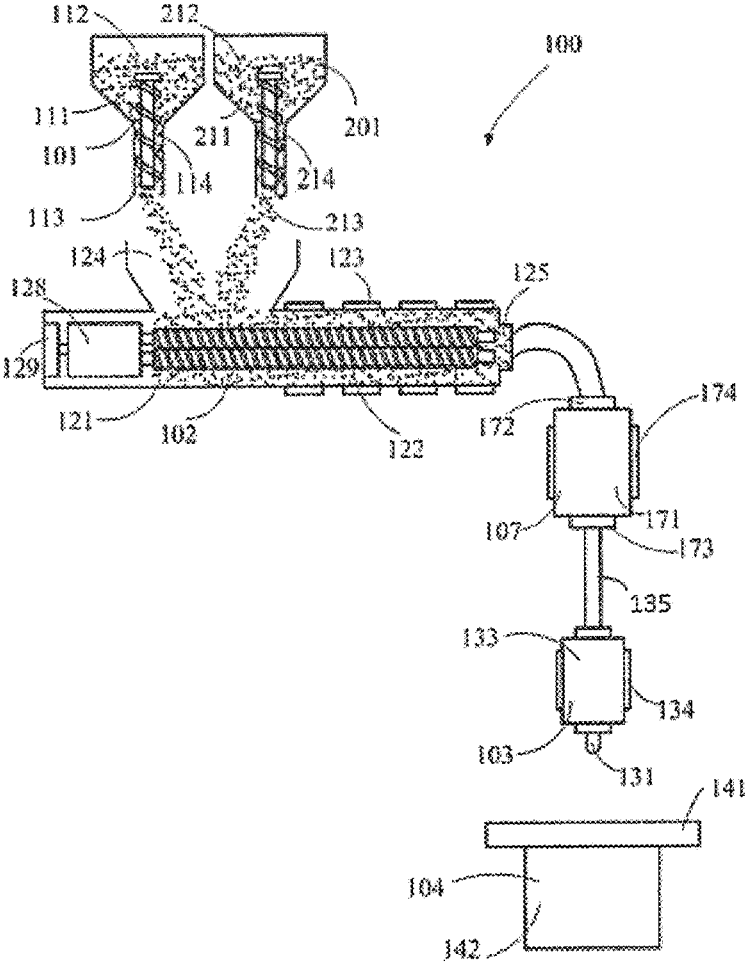
FIG. 1 illustrates a schematic diagram of a 3D printing device according to a particular embodiment of the present invention.

The following describes specific embodiments of the present invention with reference to the accompanying drawings. FIG. 1 illustrates a schematic diagram of a 3D printing device according to a particular embodiment of the present invention.

As shown in FIG. 1, a 3D printing device 100 includes a melt extrusion module 102, a printing module 103, and a platform module 104. In a printing process of the device, the melt extrusion module 102 extrudes and heats a received initial material so that the initial material is melted into a melt, and conveys the melt to the printing module 103; the printing module 103 extrudes the melt toward a specified position of the platform module 104 according to a preset data model or program; and the melt is stacked and piled up on the platform 104, to ultimately form a 3D product needing to be printed.

As shown in FIG. 1, in some embodiments, the 3D printing device may further include a feeding module 101, where the feeding module 101 has a hopper 111 configured to accommodate and convey the initial material, and the hopper 111 has a feed inlet 112 and a discharge outlet 113. In the printing process of the 3D printing device 100, the feeding module 101 receives the initial material through the feed inlet 112 of the hopper 111, and discharges the initial material to the melt extrusion module 102 through the discharge outlet 113. The initial material used in the 3D printing device 100 may be a powdered or granular material. As shown in FIG. 1, the hopper 111 is a funnel-shaped shell having a horn-like opening. In some embodiments, the initial material may alternatively be filamentous, block-like, or another shape; and correspondingly, the hopper may have a corresponding shape to adapt to the shape of the initial material. A hopper discharge control apparatus 114 is further disposed in the hopper 111. The hopper discharge control apparatus 114 controls the discharge speed of the initial material at the discharge outlet 113 of the hopper 111. The hopper discharge control apparatus 114 shown in FIG. 1 is a single screw. Disposed at a position close to the discharge outlet, the hopper discharge control apparatus 114 is connected to a motor and a gearing apparatus (not shown in FIG. 1) that drive the hopper discharge control apparatus 114 to move. The rotational speed of the screw 114 is regulated through a driving mechanism, to control the discharge speed of the initial material at the discharge outlet 113. In addition, a mixing and conveying manner of the material can be controlled by disposing a pitch and a thread of a screw portion of the screw 114. Although the hopper discharge control apparatus 114 shown in FIG. 1 is a single screw, in some embodiments, the hopper discharge control apparatus may alternatively be twin screws, or a combination of twin screws and a single screw. In some embodiments, the hopper discharge control apparatus 114 may further include a common mechanism capable of controlling the discharge speed of the initial material at the discharge outlet 113. In some embodiments, the hopper discharge control apparatus further includes a baffle plate or a barrier disposed at the discharge outlet 113, to control whether to discharge the material from the discharge outlet 113. In some embodiments, the hopper discharge control apparatus 114 may alternatively be a flow control valve disposed at the discharge outlet 113, for example, a pneumatic flow control valve, a solenoid flow control valve, or a hydraulic flow control valve, to control the discharge speed of the initial material at the discharge outlet 113 through the size of the flow control valve.

The 3D printing device 100 may further include a second feeding module 201. As shown in the figure, a structure of the second feeding module 201 is the same as or similar to that of the first feeding module 101. The second feeding module 201 similarly includes a second hopper 211 having a feed inlet 212 and a discharge outlet 213, and similarly includes a hopper discharge control apparatus 214 disposed in the hopper 211, where the hopper discharge control apparatus 214 is configured to control the discharge speed of the initial material at the discharge outlet 212. In a specific printing process of the device, the feeding module 201 may receive, through the feed inlet 212 of the hopper 211, a second initial material different from the initial material received by the feeding module 101; and discharge the second initial material to the melt extrusion module 102 through the discharge outlet 213. It may be understood that, a ratio of the initial material received by the melt extrusion module 102 to the second initial material can be controlled by controlling the hopper discharge control apparatus 114 of the feeding module 101 and the hopper discharge control apparatus 214 of the second feeding module 201, to ultimately control the ratio of the initial material to the second initial material in a product needing to be printed.

As shown in FIG. 1, the melt extrusion module 102 includes a processing chamber 121, an extrusion apparatus 122, and a processing chamber heating apparatus 123. The processing chamber 121 is a hollow shell having a feed inlet 124 and a discharge outlet 125, and the initial material discharged from the discharge outlet 113 enters the processing chamber 121 through the feed inlet 124. The processing chamber heating apparatus 123 is disposed on a peripheral wall of the processing chamber 121, to heat the material within the processing chamber 121. The extrusion apparatus 122 does work of extruding and/or shearing the material within the processing chamber 121, so that the initial material is melted into a melt and discharged through the discharge outlet 125 under a joint action of the processing chamber heating apparatus 123 and the extrusion apparatus 122.

Specifically, as shown in FIG. 1, the extrusion apparatus 122 may be twin screw 122 disposed in the processing chamber 121. The twin screw 122 are connected to a driving motor 129 through a variable-speed gear 128. Driven by the driving motor 129, the twin screw 122 rotate and extrude the material within the processing chamber 121, and drive the material to move toward the discharge outlet 125. Meanwhile, the material within the processing chamber 121 is heated by internal heat that is generated by the rotation and extrusion work of the twin screw 122. Although the extrusion apparatus 122 shown in FIG. 1 is twin screw, in some embodiments, the hopper discharge control apparatus may alternatively be a single screw. In some embodiments, the extrusion apparatus 122 may alternatively be a common extruder without any screw, for example, a piston apparatus.

As shown in FIG. 1, the processing chamber heating apparatus 123 may be such disposed as to surround an exterior wall of the processing chamber 121 in a segment-by-segment manner, to perform segment-by-segment heating, so as to implement more precise heating temperature control. In some embodiments, the processing chamber heating apparatus 123 is a common electrical heating apparatus, for example, a thermocouple wrapped around an outer side of the processing chamber 121. It may be understood that, although the processing chamber heating apparatus 123 shown in the figure is disposed on the exterior wall of the processing chamber 121, in some embodiments, the processing chamber heating apparatus 123 may alternatively be disposed in the processing chamber 121, for example, a heating rod disposed in the processing chamber 121.

In some embodiments, the melt extrusion module 102 further has a melt extrusion discharge control apparatus 126 (not shown in FIG. 1), configured to control the discharge speed of the melt at the discharge outlet 125 of the processing chamber 121. Similar to the structure of the hopper discharge control apparatus 114, the melt extrusion discharge control apparatus 126 may be a flow control valve disposed at the discharge outlet 125, for example, a pneumatic flow control valve, a hydraulic flow control valve, or a solenoid flow control valve, where the discharge speed of the melt at the discharge outlet 125 is controlled through the flow control valve. In some embodiments, the melt extrusion discharge control apparatus 126 may further have a baffle plate or a barrier disposed at the discharge outlet 125, to control whether to discharge the melt from the discharge outlet 125. It should be noted that, the extrusion apparatus 122 of the melt extrusion module 102 can control the discharge speed of the melt at the discharge outlet 125 by controlling extrusion power for extruding the initial material and the melt in the processing chamber 121. Specifically, in the twin screw 122 shown in FIG. 1, the discharge speed of the melt at the discharge outlet 125 can be controlled by controlling the rotation speed of the twin screw 122. In some embodiments, the discharge speed of the discharge outlet 125 of the melt extrusion module 102 can be regulated by controlling the feed speed of the feed inlet 124. Specifically, for example, the discharge speed of the discharge outlet 125 may be improved by improving the feed speed of the feed inlet 124. The feed speed of the feed inlet 124 of the melt extrusion module 102 can be implemented by regulating the discharge speed of the discharge outlet 113 of the feeding module 101.

In some embodiments, the 3D printing device 100 further includes a backflow channel 127 (not shown in FIG. 1). One end of the backflow channel 127 is connected to a melt channel behind the discharge outlet 125 of the processing chamber 121, and the other end of the backflow channel 127 is connected to the processing chamber 121, so that a part of the melt flows back to the processing chamber 121. In some embodiments, the backflow channel 127 is further equipped with a flow control valve, so that an amount of and the speed of a melt flowing back through the backflow channel 127 to the processing chamber 121 are regulated through the flow control valve.

As shown in FIG. 1 again, the printing module 103 may include a barrel 133 having a feed inlet and a discharge outlet. The barrel 133 is composed of a hollow shell, and a nozzle 131 is disposed at a lower part of the barrel 133. The feed inlet of the barrel 133 of the printing module 103 is connected to the discharge outlet 125 of the processing chamber 121. After the initial material is heated and melted into a melt, the melt is conveyed to the barrel 133 and ultimately extruded through the nozzle 131. Although the printing module 103 shown in FIG. 1 has only one nozzle 131, in some embodiments, the printing module 103 may include a plurality of nozzles, to implement batch production, thereby resolving a common defect of prior-art 3D printing devices of fused deposition modeling, namely, a mass production failure. The plurality of nozzles may be arranged in an array, or arranged according to another rule applicable to mass production. A specific manner of arrangement of the nozzles is described in detail later with reference to the accompanying drawings. The printing module 103 further includes a printing module driving mechanism 132 (not shown in FIG. 1). The driving mechanism 132 may be a hydraulic cylinder, a stepper motor, or another common driving mechanism. The printing module 103 is disposed on the driving mechanism 132, so that the nozzle 131 of the printing module 103 is driven to move relative to the platform module 104. As shown in FIG. 1, the barrel 133 of the printing module 103 may alternatively be equipped with a temperature regulating apparatus 134. A structure and arrangement of the temperature regulating apparatus 134 are the same as or similar to those of the processing chamber heating apparatus 123, and may be an electrical heating apparatus disposed around the barrel 133 in a segment-by-segment manner. In some embodiments, the temperature regulating apparatus 134 may alternatively be a heating rod disposed in the barrel 133. It should be noted that, the temperature regulating apparatus may further have a cooling function, for example, a semiconductor heating and cooling sheet, so that the temperature of the melt in the printing module 103 can be reduced if too high. The temperature regulating apparatus 134 is preferably disposed at a position close to the nozzle 131, so as to quickly and precisely control the temperature of the melt extruded through the nozzle 131. The barrel 133 further includes a pressure regulating apparatus (not shown in FIG. 1), configured to regulate the pressure of the melt in the printing module 103. In some embodiments, the pressure regulating apparatus may be a screw extrusion apparatus as described previously, specifically: a single screw extruder, twin screw extruder, or a combination of a single screw extruder and twin screw extruder, where the screw extrusion apparatus is disposed in the barrel 133, and controls extrusion power for the melt through screw rotation control, thereby controlling the pressure of the melt in the printing module 103, especially in the nozzle 131. In some other embodiments, the pressure regulating apparatus may alternatively be a piston extrusion mechanism, where the piston extrusion mechanism is disposed in the barrel 133 and pneumatically or hydraulically drives a piston to move, thereby controlling the pressure of the melt in the printing module 103, especially in the nozzle 131.

As shown in FIG. 1, the platform module 104 includes a deposition platform 141 and a platform driving mechanism 142 that drives the deposition platform 141 to move. The deposition platform 141 may be a plate structure, and is configured to receive the melt extruded through the nozzle 131, so that the melt is stacked on the deposition platform. Although only one deposition platform 141 is shown in FIG. 1, in some embodiments, the platform module 104 may further include a plurality of deposition platforms, to satisfy a mass production requirement during simultaneous mass printing. Structures between a plurality of deposition platforms are described in detail later with reference to other accompanying drawings.

The deposition platform 141 is disposed on the platform driving mechanism 142. The platform driving mechanism 142 can drive the deposition platform 141 to move relative to the nozzle 131. In some embodiments, the platform driving mechanism 142 may be a stepper motor disposed based on a Cartesian coordinate system, so that the platform driving mechanism 142 can drive the deposition platform 141 to move along one or more of an X-axis, a Y-axis, and a Z-axis. In some other embodiments, the 3D printing device 100 further includes a printing module driving mechanism, configured to drive the nozzle 131 of the printing module 103 to move relative to the platform module 104. In still some embodiments, the platform driving mechanism 142 may be a conveyor belt. With relative motion between the deposition platform 141 and the nozzle 131, the melt is deposited on the deposition platform 141, to form final products of complex structures and composition as required.

As shown in FIG. 1 again, the 3D printing device 100 further includes a temporary storage module 107. The temporary storage module 107 has a storage chamber 171 configured to store a melt. The storage chamber 171 has a feed inlet 172 and a discharge outlet 173. The feed inlet 172 is connected to the discharge outlet of the processing chamber 121. The discharge outlet 173 is connected to the printing module 103 through a feed channel 135. The melt extruded from the discharge outlet of the processing chamber 121 flows through the feed inlet 172 into the storage chamber 171 for temporary storage, and flows through the discharge outlet 173 into the printing module 103 for printing. As shown in the figure, the temporary storage module 107 further has a heating apparatus 174 configured to heat the melt in the storage chamber 171, and the heating apparatus 174 is disposed on an exterior wall of the storage chamber 171. In some embodiments, the heating apparatus 174 is a thermocouple surrounding the storage chamber 171.

In some embodiments, the heating apparatus 174 may alternatively be disposed in the storage chamber 171, for example, a heating rod disposed in the storage chamber 171. In some embodiments, an insulating liner is further disposed on the exterior wall of the storage chamber 171, to preserve heat for the melt in the storage chamber.

In some embodiments, the temporary storage module 107 further includes a storage chamber discharge control apparatus 175 (not shown in FIG. 1), configured to control the discharge speed of the melt at the discharge outlet 173 of the storage chamber 171. Similar to the hopper discharge control apparatus 114, the storage chamber discharge control apparatus 175 may be a single screw or twin screw disposed at a position close to the discharge outlet 173, or a combination of a single screw or twin screw, or a flow control valve disposed at the discharge outlet 173, for example, a pneumatic flow control valve, a solenoid flow control valve, or a hydraulic flow control valve. In some embodiments, a baffle plate or a barrier is further disposed at the discharge outlet 173 of the storage chamber 171, to control whether to discharge the melt from the discharge outlet 173.

Figure 2:
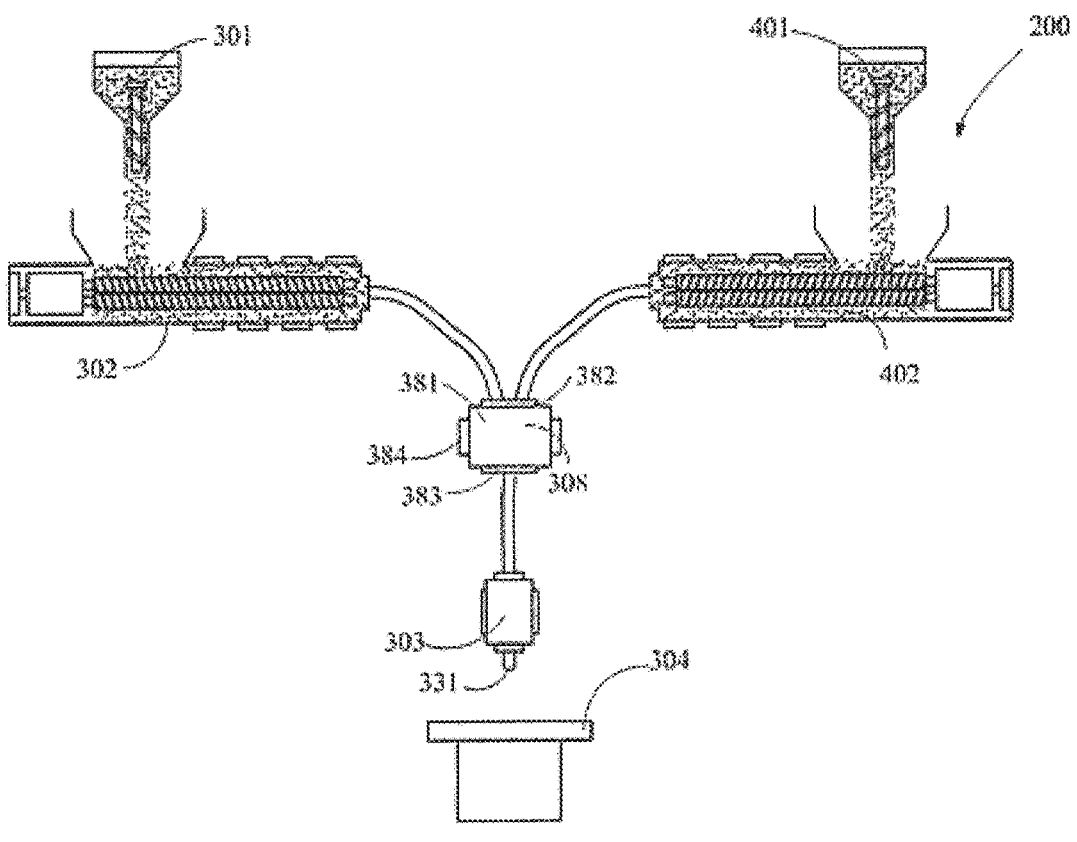
FIG. 2 illustrates a schematic diagram of a 3D printing device according to another embodiment of the present invention.

FIG. 2 illustrates a schematic diagram of a 3D printing device according to another embodiment of the present invention.

As shown in FIG. 2, a 3D printing device 200 further includes a first feeding module 301 and a second feeding module 401 that are disposed in parallel to each other, and a first melt extrusion module 302 and a second melt extrusion module 402 that are disposed in parallel to each other. Structures of the foregoing modules are the same as structures of the first feeding module 101 and the first melt extrusion module 102 as described previously. The first feeding module 301 and the second feeding module 401 receive initial materials. The initial materials are respectively heated and extruded through the first melt extrusion module 302 and the second melt extrusion module 402 and are converted into melts. The melts are discharged, and enter a mixing module 308.

As shown in FIG. 2 again, the 3D printing device 200 further includes a mixing module 308. The mixing module 308 includes a mixing chamber 381 having a feed inlet 382 and a discharge outlet 383. The feed inlet 382 of the mixing chamber 381 is connected to the first melt extrusion module 302 and the second melt extrusion module 402. A mixing mechanism 386 (not shown in FIG. 2) is disposed in the mixing chamber 308, and is configured to mix different melts that come from the first melt extrusion module 302 and the second melt extrusion module 402. In some embodiments, the mixing mechanism 386 is a mechanical stirring apparatus. In some other embodiments, however, the mixing mechanism 386 may alternatively be a pneumatic stirring mechanism.

In some embodiments, the mixing module 308 further has a heating apparatus 384, configured to heat and preserve heat for the melt in the mixing chamber 381. The heating apparatus 384 may be disposed on an exterior wall of the mixing chamber 381. In some embodiments, the heating apparatus 384 is a thermocouple surrounding the mixing chamber 381. In some embodiments, the heating apparatus 384 may alternatively be disposed in the mixing chamber 381, for example, a heating rod disposed in the mixing chamber 381.

In some embodiments, the mixing module 308 further includes a mixing chamber discharge control apparatus 385 (not shown in FIG. 2), configured to control the discharge speed of the melt at the discharge outlet 383 of the mixing chamber 381. Similar to the hopper discharge control apparatus 114, the mixing chamber discharge control apparatus 385 may be a single screw or twin screw disposed at a position close to the discharge outlet 383, or a combination of a single screw or twin screw, or a flow control valve disposed at the discharge outlet 383, for example, a pneumatic flow control valve, a solenoid flow control valve, or a hydraulic flow control valve. In some embodiments, a baffle plate or a barrier is further disposed at the discharge outlet 383 of the mixing chamber, to control whether to discharge the melt from the discharge outlet 383. The mixing module 308 may enable sufficient mixing of some solid-state initial materials that cannot be sufficiently mixed or can hardly be mixed, to form an even mixed melt, so that the mixed melt discharged from the discharge outlet 383 enters a printing module 303 and is stacked on a platform module 304 after being extruded through a nozzle 331, thereby forming a final product with mixed components.

Figure 9A:
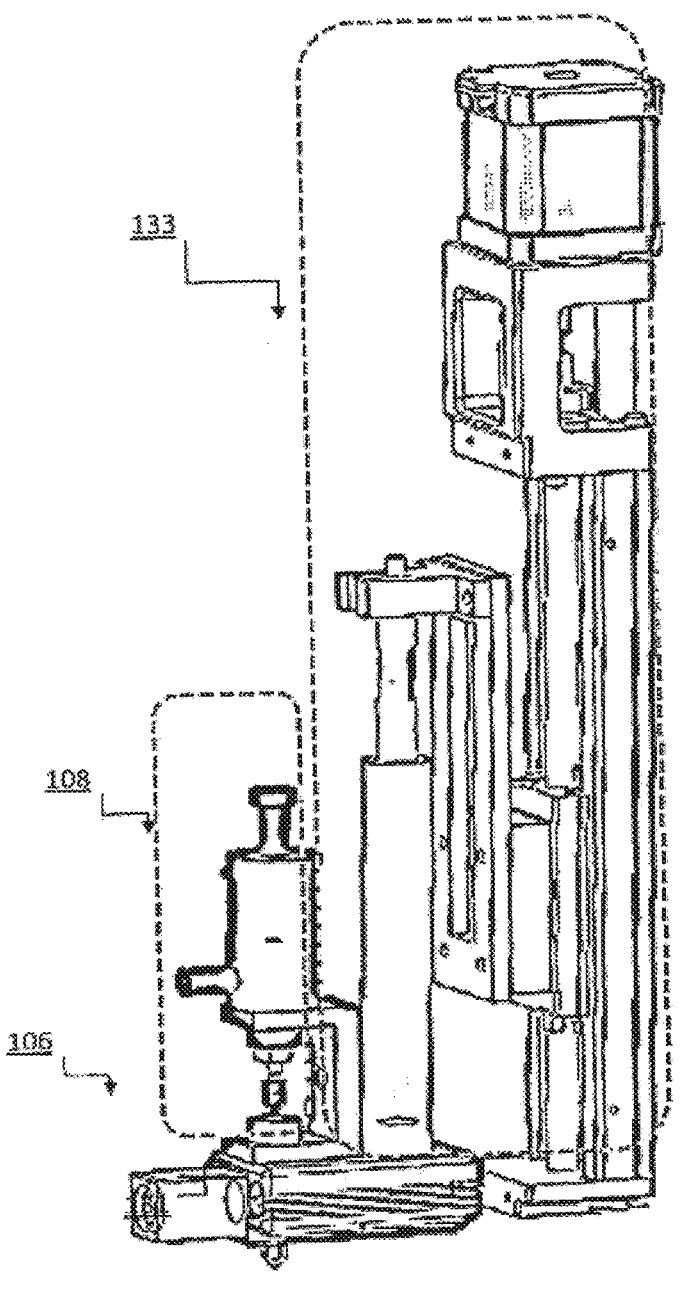
FIG. 9A illustrates a schematic diagram of a 3D printing device according to another embodiment of the present invention.

FIG. 9A illustrates a schematic diagram of a printing module and a nozzle according to a particular embodiment of the present invention. The device includes a barrel 133, configured to melt and pressurize a material. The melted and pressurized material flows through a feed channel, where the feed channel is connected to a nozzle 131. A pressure sensor 106 is positioned proximal to the nozzle and the terminus of the feed channel, and can measure the pressure of the material within the feed channel. Optionally, the pressure sensor 106 can be designed to directly measure the pressure of the material within the nozzle 131. A control switch 108 includes a linear actuator and a sealing needle, and can control the sealing needle to switch between an open position and a closed position. The linear actuator may be a mechanical actuator (which may include a screw), a hydraulic actuator, a pneumatic actuator (which may include a pneumatic valve), or a solenoid actuator (which may include a solenoid valve). In some embodiments, the actuator includes a pin cylinder, for example, a pneumatic pin cylinder. In some embodiments, the actuator includes a spring-assisted pneumatic cylinder. In some embodiments, the spring-assisted pneumatic cylinder includes a spring that assists the sealing needle in acting (i.e. pull the sealing needle to move from the open position to the closed position). In some embodiments, the spring-assisted pneumatic cylinder includes a spring that assists in withdrawing the sealing needle (i.e. pulling the sealing needle to move from the closed position to the open position). When the sealing needle is in the open position, the pressurized melted material can flow through the feed channel and flow through an extrusion port of the nozzle 131. When a signal is sent to the control switch 108, the control switch 108 lowers the sealing needle to the closed position, and a tip of the sealing needle engages with an inner surface of the nozzle 131.

In some embodiments of the present invention, the material is a non-filamentous material, such as powder, a granule, a gel, or a paste. The non-filamentous material is melted and pressurized, so that it can be extruded through the extrusion port of the nozzle. As described further herein, the pressure of a particularly viscous material is precisely controlled to ensure precise and accurate depositing of the material. The material can be heated and melted in the printing module by using one or more heaters disposed in the printing module (for example, inside or surrounding a barrel, a feed channel, and/or a printing head). In some embodiments, the melting temperature of the material is about 50° C. or higher, for example, about 60° C. or higher, about 70° C. or higher, about 80° C. or higher, about 100° C. or higher, about 120° C. or higher, about 150° C. or higher, about 200° C. or higher, or about 250° C. or higher. In some embodiments, the melting temperature of the material is about 400° C. or lower, for example, about 350° C. or lower, about 300° C. or lower, about 260° C. or lower, about 200° C. or lower, about 150° C. or lower, about 100° C. or lower, or about 80° C. or lower. The material extruded from the nozzle can be extruded at a temperature equal to or higher than the melting temperature of the material. In some embodiments, the material is extruded at a temperature of about 50° C. or higher, for example, about 60° C. or higher, about 70° C. or higher, about 80° C. or higher, about 100° C. or higher, about 120° C. or higher, about 150° C. or higher, about 200° C. or higher, or about 250° C. or higher. In some embodiments, the material is extruded at a temperature of about 400° C. or lower, for example, about 350° C. or lower, about 300° C. or lower, about 260° C. or lower, about 200° C. or lower, about 150° C. or lower, about 100° C. or lower, or about 80° C. or lower.

The device according to the present invention is useful for accurately and precisely extruding a viscous material. In some embodiments, when extruded from the device, the material has a viscosity of about 100 Pa·s or higher, for example, about 200 Pa·s or higher, about 300 Pa·s or higher, about 400 Pa·s or higher, about 500 Pa·s or higher, about 750 Pa·s or higher, or about 1000 Pa·s or higher. In some embodiments, the material has a viscosity of about 2000 Pa·s or lower, for example, about 1000 Pa·s or lower, about 750 Pa·s or lower, about 500 Pa·s or lower, about 400 Pa·s or lower, about 300 Pa·s or lower, or about 200 Pa·s or lower.

In some embodiments, the material is a pharmaceutical material. In some embodiments, the material is inert or biologically inert. In some embodiments, the material is an erodible material or a bio-erodible material. In some embodiments, the material is a non-erodible material or a non-bio-erodible material. In some embodiments, the material is a pharmaceutical material. In some embodiments, the material includes one or more thermoplastic materials, one or more non-thermoplastic materials, or a combination of one or more thermoplastic materials and one or more non-thermoplastic materials. In some embodiments, the material is a polymer or a co-polymer.

In some embodiments, the material includes a thermoplastic material. In some embodiments, the material is a thermoplastic material. In some embodiments, the material is or includes an erodible thermoplastic material. In some embodiments, the thermoplastic material is edible (i.e. suitable for consumption by an individual). In some embodiments, the thermoplastic material is selected from a hydrophilic polymer, a hydrophobic polymer, a swellable polymer, a non-swellable polymer, a porous polymer, a non-porous polymer, an erodible polymer (such as a dissolvable polymer), a pH-sensitive polymer, a natural polymer, a wax-like material, and a combination thereof. In some embodiments, the thermoplastic material is one of or a combination of the following: cellulose ether, cellulose ester, acrylic resin, ethyl cellulose, hydroxylpropyl methyl cellulose, hydroxylpropyl cellulose, hydroxyl methyl cellulose, mono- or diglyceride of $C_{12}$-$C_{30}$ fatty acid, $C_{12}$-$C_{30}$ fatty alcohol, wax, poly(meth) acrylic acid, polyvinyl caprolactam-polyvinyl acetate-polyethylene glycol graft copolymer 57/30/13, polyvinylpyrrolidone-vinyl acetate copolymer (PVP-VA), polyvinylpyrrolidone-vinyl acetate copolymer (PVP-VA) 60/40, polyvinylpyrrolidone (PVP), polyvinyl acetate (PVAc), polyvinylpyrrolidone (PVP) 80/20, vinylpyrrolidone-vinyl acetate copolymer (VA64), polyethylene glycol-polyvinyl alcohol graft copolymer 25/75, kollicoat IR-polyving alcohol 60/40, polyvinyl alcohol (PVA or PV-OH), poly(vinyl acetate) (PVAc), butyl methacrylate-(2-dimethylaminoethyl) methacrylate-methyl methacrylate copolymer 1:2:1, dimethylaminoethyl methacrylate-co-methacrylic esterm, ethyl acrylate-methyl methacrylate-trimethylammonium ethyl methacrylate chloride copolymer, methyl acrylate-methyl methacrylate-methacrylic acid copolymer 7:3:1, methacrylic acid-methyl methacrylate copolymer 1:2, methacrylic acid-ethyl acrylate copolymer 1:1, polyethylene oxide (PEO), polyethylene glycol (PEG), hyperbranched polyesteramide, hydroxypropyl methyl cellulose phthalate, hypromellose phthalate, hydroxypropyl methyl cellulose or hypromellose (HMPC), hydroxypropyl methylcellulose acetate succinate or hypromellose acetate succinate (HPMCAS), poly(lactide-co-glycolide) (PLGA), carbomer, ethylene-vinyl acetate copolymer, polyethylene (PE) and polycaprolactone (PCL), hydroxyl propyl cellulose (HPC), polyoxyethylene 40 hydrogenated castor oil, methyl cellulose (MC), ethyl cellulose (EC), poloxamer, hydroxypropyl methyl cellulose phthalate (HPMCP), poloxamer, hydrogenated castor oil, hydrogenated soybean oil, glyceryl palmitostearate, Brazilian palm wax, polylactic acid (PLA), polyglycolic acid (PGA), cellulose acetate butyrate (CAB), polyvinyl acetate phthalate (PVAP), wax, beeswax, hydrogel, gelatin, hydrogenated vegetable oil, polyvinyl acetal diethyl aminolactate (AEA), paraffin, shellac, sodium alginate, cellulose acetate phthalate (CAP), Arabic gum, xanthan gum, glycerol monostearate, octadecanoic acid, thermoplastic starch, and derivatives thereof (for example, the salts, amides, or esters thereof).

In some embodiments, the erodible material includes a non-thermoplastic material. In some embodiments, the erodible material is a non-thermoplastic material. In some embodiments, the non-thermoplastic material is non-thermoplastic starch, sodium starch glycoacetate (CMS-Na), sucrose, dextrin, lactose, microcrystalline cellulose (MCC), mannitol, magnesium stearate (MS), powdered silica gel, glycerol, syrup, lecithin, soybean oil, tea oil, ethanol, propylene glycol, glycerol, Tween, animal fat, silicone oil, cocoa butter, fatty acid glyceride, vaseline, chitosan, cetyl alcohol, stearyl alcohol, polymethacrylate, non-toxic polyvinyl chloride, polyethylene, ethylene-vinyl acetate copolymer, silicone rubber, or a combination thereof.

Exemplary materials that may be used with the device described herein or the methods described herein include, but are not limited to: poly (methyl) acrylate copolymer (such as a copolymer containing one or more of amino alkyl methacrylic acid, methacrylic acid, methacrylic ester and/or ammonium alkyl methacrylate, such as a copolymer sold under the brand name Eudragit® RSPO) and hydroxyl propyl cellulose (HPC).

In some embodiments, the material includes a drug. In some embodiments, the material is admixed with a drug.

The material can be pressurized in the printing module by using a pressure regulating apparatus. The material is preloaded into a barrel, and a pressure regulating apparatus (not shown FIG. 1) can apply a pressure to the material preloaded in the barrel 133. The pressure regulating apparatus may be a motor (for example, a stepper motor), a valve, or any other suitable control device that drives a mechanism, for example, a piston, a pressure screw, or compressed air (i.e. a pneumatic controller), to apply a pressure to the material contained within the barrel. The barrel includes one or more heaters that can melt the material. In some embodiments, the heater is disposed in the barrel. In some embodiments, the heater is disposed on the flank of the barrel or surrounding the barrel. In some embodiments, the heater is an electric radiant heater, for example, an electric heating tube or coil.

The heater of the barrel is preferably a high-efficiency heater with a high voltage and high output power. In some embodiments, the heater of the barrel has a rated voltage between 110 V and 600 V. In some embodiments, the heater of the barrel has a rated voltage between 210 V and 240 V. In some embodiments, the heater of the barrel is a 220 V heater. In some embodiments, the heater of the barrel has output power between about 30 W and about 100 W, for example, between 40 W and 80 W, or about 60 W. In some embodiments, the heater is an electric heating coil that surrounds the outside of the barrel. Preferably, the barrel is made of a heat-resistant material, such as stainless steel (for example, 316L stainless steel). In some embodiments, the device includes one or more temperature sensors. The one or more temperature sensors are positioned proximal to the feed channel or inside the feed channel. The temperature sensor is configured to measure the temperature of the material within the feed channel. The feed channel is relatively wide, when compared with the extrusion port of the nozzle. In some embodiments, the feed channel has a diameter between about 1 mm and about 15 mm, for example, between about 1 mm and about 5 mm, between about 5 mm and about 10 mm, or between about 10 mm and about 15 mm. In an exemplary embodiment, the feed channel has a diameter of about 8 mm.

A printing head of the device includes a nozzle 131. The nozzle includes an extrusion port through which a melted material is extruded. The extrusion port is located at the distal end of the nozzle relative to the feed channel. When the sealing needle is in the open position, the melted material flows out of the extrusion port from the feed channel through the nozzle. The nozzle includes a tapered inner surface, with the extrusion port close to the vertex of the tapered inner surface. In some embodiments, the inner surface of the nozzle includes a pad or a liner. The pad or the liner can be made of polytetrafluoroethylene (PTFE) or any other suitable material. In some embodiments, the printing head includes one or more heaters, which may be located inside, surrounding, or proximal to the nozzle of the printing head. The one or more heaters are configured to heat the material within the nozzle. The material may have a temperature that is the same as or different from the temperature of the material in the barrel or in the feed channel. In some embodiments, a heater of the nozzle is an electric radiant heater, for example, an electric heating tube or coil. The heater may be a lower-voltage and/or lower-power heater than a heater of the barrel or a heater of the feed channel. In some embodiments, the heater of the nozzle has a rated voltage between 6 V and 60 V. In some embodiments, the heater of the nozzle is a 12 V heater. In some embodiments, the heater of the nozzle has output power between about 10 W and about 60 W, for example, between 20 W and 45 W, or about 30 W.

In some embodiments, the device includes one or more temperature sensors. In some embodiments, the printing head includes one or more temperature sensors positioned proximal to or inside the nozzle, to measure the temperature of the material within the nozzle. In some embodiments, the device includes a temperature sensor located inside or proximal to a material pipe, or a temperature sensor configured to measure a temperature inside the material pipe. In some embodiments, the device includes a temperature sensor located inside or proximal to the feed channel, or a temperature sensor configured to measure a temperature inside the feed channel. In some embodiments, the device includes a temperature sensor located inside or proximal to the printing head, or a temperature sensor configured to measure a temperature inside the nozzle. In some embodiments, the one or more temperature sensors are connected to a computer system that operates the one or more heaters in response to a temperature reported by the one or more temperature sensors. For example, the computer system can operate the one or more heaters to regulate the temperature of the material within the barrel, the feed channel, and/or the nozzle. In some embodiments, the system operates as a closed-loop feedback system to maintain an approximately constant temperature inside the device or inside a component of the device (i.e. the barrel, the nozzle, or the feed channel). The temperatures of materials within different components of the device may be the same or different. In some embodiments, the feedback system is operated by using a proportional-integral-derivative (PID) controller, a bang-bang controller, a predictive controller, a fuzzy control system, an expert system controller, or any other suitable algorithm.

The device includes one or more pressure sensors 106, which can measure the pressure of the material within the device. In some embodiments, the pressure sensor is configured to measure the pressure of the material within the printing head or within the feed channel close to the printing head. In some embodiments, the pressure sensor is disposed in the printing head, or disposed at a position adjacent to the feed channel and close to the printing head. In some embodiments, the pressure sensor may work together with a pressure regulating apparatus of a closed-loop feedback system, to provide the material within the device with an approximately constant pressure. For example, when the pressure sensor measures that the pressure drops, the feedback system may send a signal to the pressure regulating apparatus, so as to increase the pressure of the material (for example, by lowering a piston, increasing an air pressure inside the barrel, or turning a pressure screw). Similarly, when the pressure sensor measures that the pressure rises, the feedback system may send a signal to the pressure regulating apparatus, so as to reduce the pressure of the material (for example, by raising the piston, decreasing the air pressure inside the barrel, or turning the pressure screw). The constant pressure ensures that the melted material within the device passes through the extrusion port of the nozzle at a constant rate when the sealing needle is in the open position. However, when the sealing needle is in the closed position, an increase in the constant temperature (for example, by raising the piston, decreasing the air pressure inside the barrel, or turning the pressure screw) may cause the melted material to leak through the nozzle. In addition, when the sealing needle switches back from the open position to the closed position or switches back from the closed position to the open position, the feedback system that includes the pressure sensor and the pressure regulating apparatus will maintain an approximately constant pressure inside the system. When the sealing needle switches from the closed position to the open position, a ramp-up of the extrusion rate is minimized, because the pressure of the material within the system does not need to be increased. In some embodiments, the pressure sensor 106 is connected to a computer system that operates the barrel to pressurize the material to a desired pressure in response to the pressure reported by the pressure sensor 106. For example, the computer system can operate the pressure regulating apparatus to regulate an amount of pressure exerted on the material within the barrel. In some embodiments, the system operates as a closed-loop feedback system to maintain an approximately constant pressure inside the device. In some embodiments, the feedback system is operated by using a proportional-integral-derivative (PID) controller, a bang-bang controller, a predictive controller, a fuzzy control system, an expert system control-ler, or any other suitable algorithm. In some embodiments, the pressure sensor is precise within 0.005 MPa, within 0.008 MPa, within 0.05 MPa, within 0.1 MPa, within 0.2 MPa, within 0.5 MPa, or within 1 MPa. In some embodi-ments, a sampling time of the pressure sensor is about 20 ms or less, for example, about 10 ms or less, about 5 ms or less, or about 2 ms or less. In some embodiments, the pressure of the material is within about 0.005 MPa, about 0.008 MPa, about 0.05 MPa, about 0.1 MPa, about 0.2 MPa, about 0.5 MPa, or about 1 MPa of the desired pressure.

The device includes a control switch 108. The control switch 108 can be operated to prevent or allow the melted material to flow from the extrusion port of the device. The control switch 108 includes a sealing needle operable between an open position and a closed position, where the material is inhibited from flowing through the nozzle 131 when the sealing needle is in the closed position. The sealing needle extends through at least a portion of the feed channel and includes a tapered end. When the sealing needle is in the closed position, the tapered end of the sealing needle engages with the tapered inner surface of the nozzle 131 (for example, at the extrusion port of the nozzle).

In some embodiments, any portion of the sealing needle that contacts the material is free of protrusions. A protrusion can be any portion of the sealing needle that has a diameter larger than a shaft of the sealing needle, or any portion of the sealing needle that extends outward further than the shaft of the sealing needle. A protrusion on the sealing needle can push the melted material to pass through the extrusion port when the sealing needle is in the closed position, and is preferably avoided. In some embodiments, the entire sealing needle (regardless of whether the sealing needle contacts the material or not) is free of protrusions. In some embodiments, a portion of the sealing needle that does not contact the material includes one or more protrusions, which may, for example, engage with a component of the actuator or act as a depth break to prevent the sealing needle from being driven too far within a feed chamber.

The portion of the sealing needle that contacts the mate-rial (i.e. the portion located in the feed channel when the sealing needle is in the open position or the closed position) is relatively thin compared with the feed channel, and allows the melted material to flow around the sealing needle rather than being pushed out of the extrusion port. In some embodiments, the portion of the sealing needle that contacts the material has a largest diameter of about 0.2 mm to 3.0 mm, for example, about 0.2 mm to 0.5 mm, about 0.5 mm to 1.0 mm, about 1.0 mm to 1.5 mm, about 1.5 mm to 2.0 mm, about 2.0 mm to 2.5 mm, or about 2.5 mm to 3.0 mm. In some embodiments, the sealing needle (including the portion of the sealing needle that contacts the material and the portion of the sealing needle that does not contact the material) has a largest diameter of about 0.2 mm to 3.0 mm, for example, about 0.2 mm to 0.5 mm, about 0.5 mm to 1.0 mm, about 1.0 mm to 1.5 mm, about 1.5 mm to 2.0 mm, about 2.0 mm to 2.5 mm, or about 2.5 mm to 3.0 mm.

In some embodiments, the sealing needle includes a pointed tip at the tapered end, as shown in FIG. 10A. In some embodiments, the tapered end of the tip is frustoconi-cal, as shown in FIG. 10B. Both the nozzle and the sealing needle include tapered surfaces so that the tapered end of the sealing needle faces the tapered inner surface of the nozzle. The "taper angle" herein refers to the angle of the vertex of a joining surface. In the instance of a frustoconical tapered tip, the "taper angle" refers to the vertex of an extrapolated joining surface. The taper angle of the tapered end of the sealing needle is indicated by a in FIG. 10A and FIG. 10B. As shown in FIG. 10C, the taper angle of the nozzle is indicated by β. In some embodiments, the taper angle of the tapered end of the sealing needle is about 60° or less, for example, about 50° or less, about 45° or less, about 40° or less, about 35° or less, about 30° or less, about 25° or less, about 20° or less, or about 15° or less. In some embodi-ments, the taper angle (α) of the sealing needle is equal to or less than the taper angle (β) of the inner surface of the nozzle. In some embodiments, a ratio of the taper angle (β) of the inner surface of the nozzle to the taper angle (α) of the sealing needle is about 1:1 to about 4:1, or about 1:1 to about 3:1, or about 1:1 to about 2:1.

The sealing needle is positioned in the closed position by lowering the sealing needle towards the extrusion port, and in this case the sealing needle is aligned with the extrusion port. When the sealing needle is in the open position, the pressurized and melted material can flow through the extru-sion port. When the sealing needle is in the closed position, however, the pressurized and melted material is prevented from flowing, where the sealing needle engages with the inner surface of the nozzle. When the taper angle (β) of the inner surface of the nozzle is larger than the taper angle (α) of the sealing needle, the tapered end of the sealing needle engages with the inner surface of the nozzle at the extrusion port. In some embodiments, the extrusion port has a diam-eter of about 0.1 mm or more, for example, about 0.15 mm or more, about 0.25 mm or more, about 0.5 mm or more, or about 0.75 mm or more. In some embodiments, the extrusion port has a diameter of about 1 mm or less, for example, about 0.75 mm or less, about 0.5 mm or less, about 0.25 mm or less, or about 0.15 mm or less. The base of the tapered end of the sealing needle is preferably thin to inhibit the melted material from being pushed to pass through the extrusion port when the sealing needle is in the closed position. In some embodiments, a ratio of the largest diameter of the tapered end of the sealing needle (i.e. the base of the taper) to the diameter of the extrusion port is about 1:0.8 to about 1:0.1, for example, about 1:0.8 to about 1:0.7, about 1:0.7 to about 1:0.6, about 1:0.6 to about 1:0.5, about 1:0.5 to about 1:0.4, about 1:0.4 to about 1:0.3, about 1:0.3 to about 1:0.2, or about 1:0.2 to about 1:0.1.

The sealing needle preferably includes a strong yet flex-ible material. Exemplary materials include but are not lim-ited to stainless steel, polytetrafluoroethylene (PTFE) and carbon fiber. In some embodiments, the inner surface of the nozzle includes a flexible pad or liner, which can inhibit damage to the needle or nozzle upon repeated repositioning of the sealing needle in the open position or closed position. In some embodiments, the pad or liner is made of polytet-rafluoroethylene (PTFE).

The sealing needle of the control switch is controlled by using an actuator that can position the sealing needle in an open position (i.e. by raising the sealing needle so that the tapered end of the sealing needle no longer engages with the inner surface of the nozzle) or a closed position (i.e. by lowering the sealing needle so that the tapered end of the sealing needle engages with the inner surface of the nozzle). In some embodiments, the actuator is a pneumatic actuator, and can be controlled by using air pressure inside the actuator. In some embodiments, the actuator is a mechanical actuator, which can raise or lower the sealing needle through the use of one or more gears and a motor. In some embodi-ments, the actuator includes a solenoid valve or an elec-trostrictive polymer.

Figure 9B:
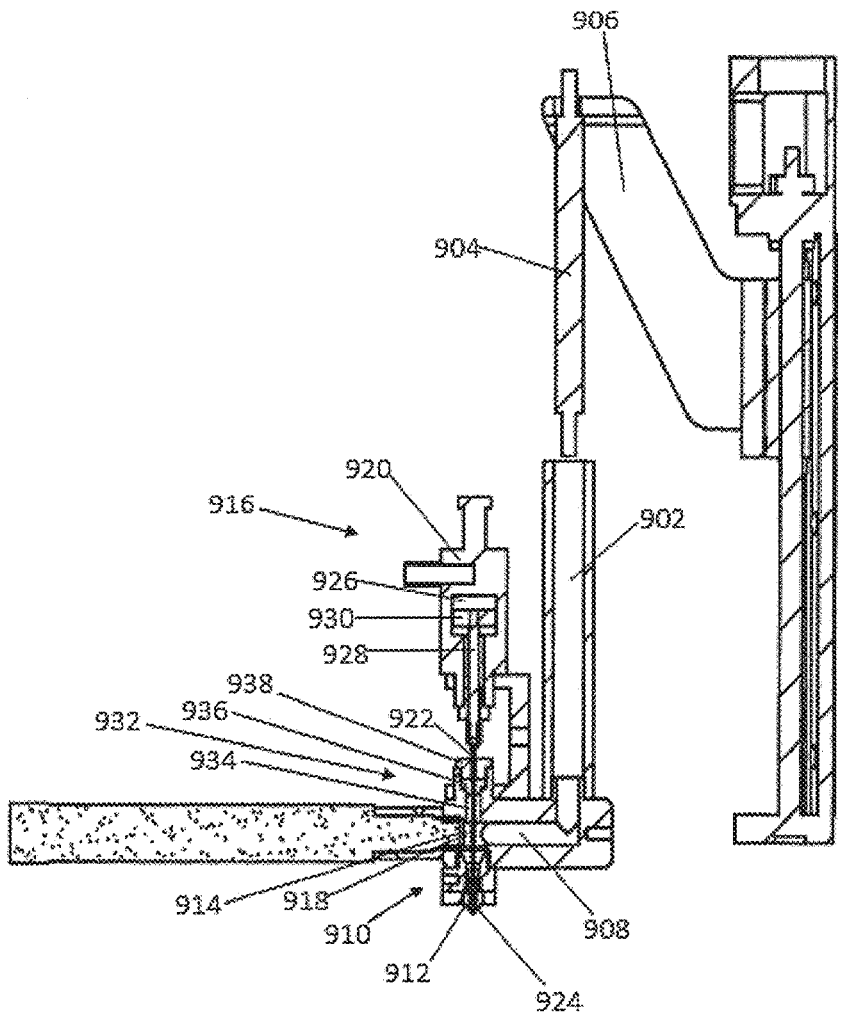
FIG. 9B illustrates a perspective view of a 3D printing device according to another embodiment of the present invention.

FIG. 9B illustrates a cross-sectional view of an exemplary device for depositing a material by additive manufacturing according to the present invention. A material can be loaded onto a barrel 902, and a piston 904 applies a pressure to the material by pushing into the barrel 902. The piston 904 is connected to a pressure regulating apparatus through a guide arm 906. The piston 904 is lowered by a motor, such as a stepper motor, to increase the pressure of the material in the barrel 902, or is raised to lower the pressure of the material. The material in the barrel 902 can be heated to or above a melting temperature of the material by using a heater inside or surrounding the barrel 902. The melted material from the barrel 902 flows through a feed channel 908, where the feed channel 908 is connected to a printing head 910 that includes a nozzle 912. A pressure sensor 914 is located at the end of the feed channel 908, and close to the printing head 910, and is configured to measure the pressure of the material close to the printing head. In some embodiments, the pressure sensor 914 is positioned to measure the pressure of the material within the printing head 910. The pressure sensor 914 can transmit the measured pressure to a computer system, where the computer system can operate the pressure regulating apparatus (or a motor of the pressure regulating apparatus) to reposition the piston 904 and control the pressure of the material within the barrel 902. This can be operated in a feedback system, where the change of the pressure is then measured by the pressure sensor 914, and the computer system further operates the pressure regulating apparatus.

The device includes a control switch 916, and the control switch 916 includes a sealing needle 918 and a linear actuator 920. The sealing needle 918 includes an upper end 922 that engages with the actuator 920, and a lower end 924 that is tapered. The sealing needle 918 extends through the feed channel 908 into the printing head 910. The actuator 920 operates the sealing needle 918 between an open position (raised) and a closed position (lowered). When the sealing needle 918 is in the closed position, the tapered end 924 of the sealing needle 918 engages with a tapered inner surface of the nozzle 912 to inhibit flowing of the melted material through the nozzle. To open the nozzle 912 and allow the melted material to flow through an extrusion port, the actuator 920 operates the sealing needle 918 to position the sealing needle 918 in the open position by raising the sealing needle 918, so that the tapered lower end 924 is disengaged from the inner surface of the nozzle 912.

Figure 9C:
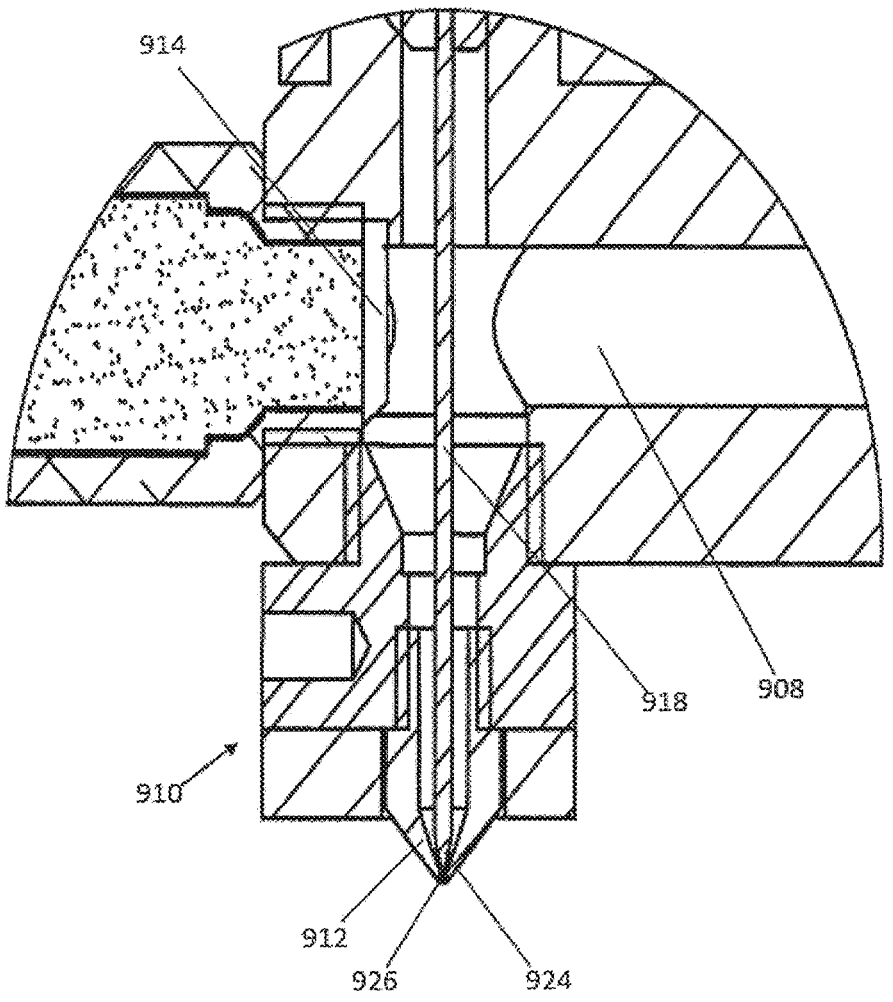
FIG. 9C illustrates an enlarged view of a printing head according to another embodiment of the present invention.

FIG. 9C illustrates an enlarged view of the printing head 910 when the sealing needle 918 is in the closed position and engages with the nozzle 912. In the closed position, the tapered end 924 of the sealing needle 918 is inserted into an extrusion port 926 by engaging with the tapered inner surface of the nozzle 912. The melted material in the feed channel 908 is therefore prevented from flowing through the extrusion port 926. The pressure of the material within or proximal to the printing head 910 is measured by the pressure sensor 914, and the pressure regulating apparatus can be operated to prevent excess pressure buildup in the device when the sealing needle 918 is in the closed position.

The sealing needle 918 extends through the feed channel 908 into the printing head 910. When the sealing needle 918 switches from the open position to the closed position, a careful design prevents the melted material in the feed channel 908 from being pushed out of the extrusion port 926. The tapered end 924 of the sealing needle 918 allows the sealing needle 918 to pierce the melted material, allowing the melted material to flow upward and around the enclosed sealing needle 918 instead of being pushed down.

The pneumatic actuator 920 includes a solenoid valve, configured to control the flow of gas into an air chamber 926. The air chamber can drive up or down a central rod 928 attached to the upper end 922 of the sealing needle 918. High-pressure gas flows into the air chamber 926 from a position below a diaphragm 930, or gas is removed from a position above the diaphragm 930, so that the diaphragm 930 moves upward, thereby positioning the sealing needle 918 in the open position. The gas is removed from a position below the diaphragm 930, or the high-pressure gas is applied above the diaphragm 930, so that the diaphragm 930 moves downward, thereby positioning the sealing needle 918 in the closed position.

FIG. 9D illustrates an exploded view of components of a pneumatic actuator that is connected to a sealing needle to control the sealing needle. A diaphragm 942 is located in an air chamber of the pneumatic actuator, and is connected to a central rod 974, for example, through a threaded fit. The central rod 974 is connected to an adapter 976, for example, through a threaded fit. The adapter 976 is attached to a sealing needle 978, for example, through a threaded fit or through a force fit. For example, a lower part of the adapter 976 may include an opening, and an upper part of the sealing needle 978 can be snugly fit into the opening by jamming the sealing needle 978 into the opening of the adapter 976. The sealing needle 978 passes through a gasket 980, where the gasket 980 is held in place by a fixing nut 982. The fixing nut 982 is attached to the rest of the device through a manifold block, which holds the fixing nut 982 and the gasket in place. As shown in FIG. 9B, a manifold block 932 is positioned above the feed channel 908, and is aligned with the nozzle 912 of the printing head 910. A manifold block channel 934 passes through the manifold block 932 to enter the feed channel. The gasket 936 fits into an opening on the top of the manifold block 932, where the opening is wider than the channel 934, thereby preventing the gasket 936 from moving toward the printing head 910. The gasket 936 may be made of an inert pliable material, such as plastic or synthetic rubber, and seals the feed channel 908 to prevent leakage of the melted material. In some embodiments, the gasket is made of polytetrafluoroethylene (PTFE). A fixing nut 938 is secured to the manifold block 932, for example, through a threaded fit, and secures the gasket 936. Accordingly, the gasket 936 is in a fixed position relative to the printing head 910 and the nozzle 912. The sealing needle 918 passes through a hole in the fixing nut 938 and the gasket 936 to reach the feed channel 908. The hole is sized to allow the needle to pass through and move as controlled by the actuator 916, but is not so large as to allow leakage of the melted material.

Figure 13A:
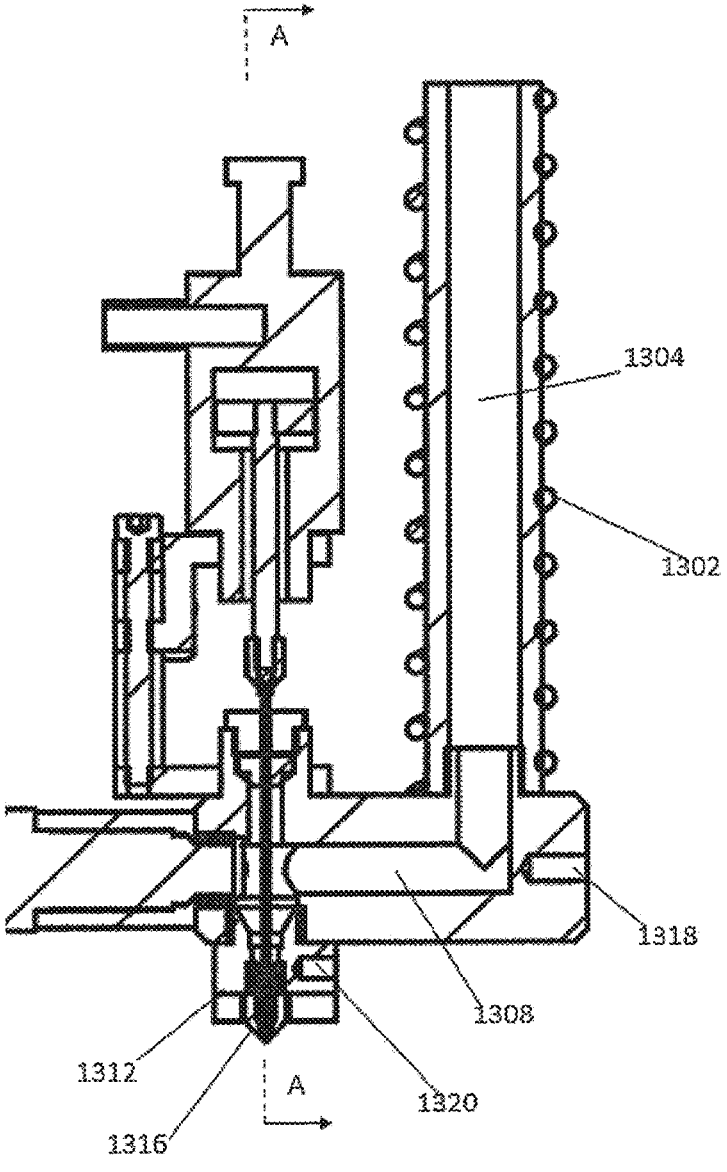
FIGS. 13A-13C illustrate a schematic diagram of a 3D printing device according to another embodiment of the present invention.
Figure 13B:
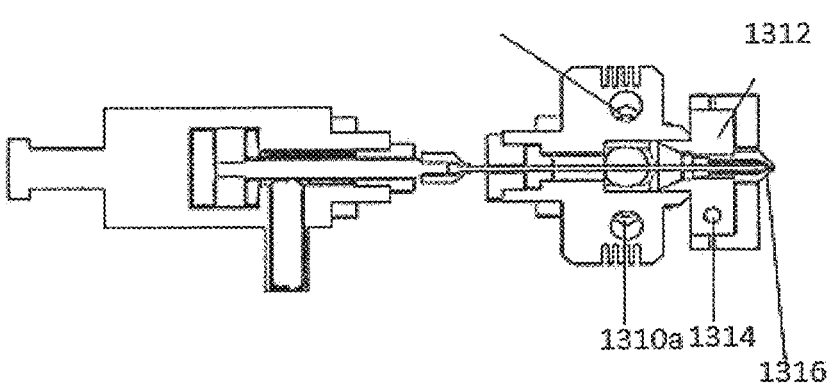
Figure 13C:
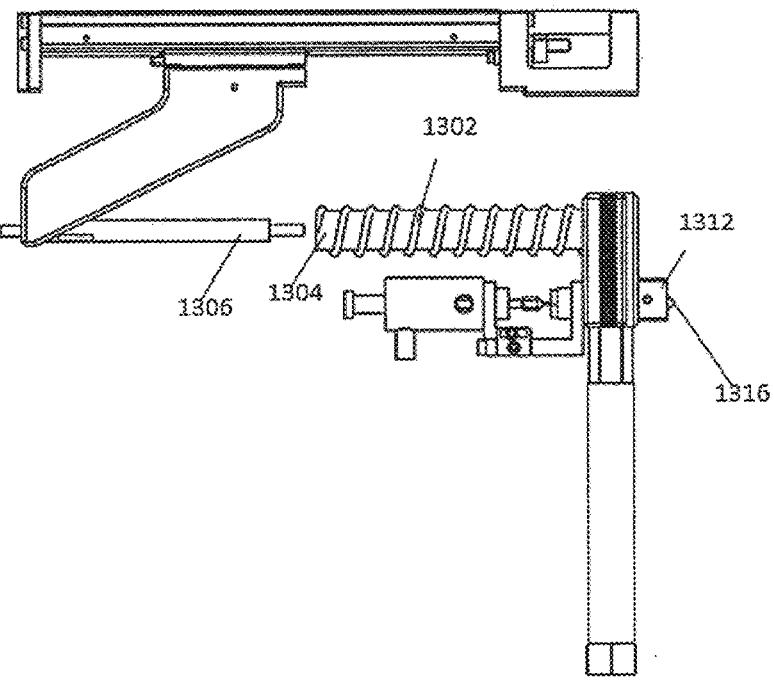

The printing module includes one or more heaters configured to melt a material. The heater can be placed around or inside a barrel that contains the material, the feed channel and/or the printing head. FIG. 13A shows a longitudinal section view of a portion of the device, with FIG. 13B showing a cross-sectional view of the apparatus at a plane "A-A", and FIG. 13C showing a non-cross sectional view of the device. In some embodiments, the device includes a heater 1302 surrounding a barrel 1304 of the device. The heater 1302 can heat and melt a material contained within the barrel 1304. The heater 1302 may be, for example, a coil heater that surrounds the outside of the barrel 1304. In some embodiments, the heater is disposed in the barrel. The material placed within the barrel is initially melted in the barrel by the heater, and a pressure is applied to the material by a piston 1306. Then the melted material flows from the barrel 1304 to a feed channel 1308. In some embodiments, to ensure that the material in the feed channel 1308 remains a desired temperature, one or more heaters can be disposed proximal to or inside the feed channel 1308. FIG. 13B and FIG. 13C illustrate two heaters 1310*a* and 1310*b*, which are located on two sides of the feed channel 1308 and adjacent to the feed channel 1308. In some embodiments, the heater 1310*a* or the heater 1310*b* or both span the length of the feed channel 1308, or span the length of the flank of the feed channel 1308. In some embodiments, the one or more heaters adjacent to or inside the feed channel 1308 are a heating rod. In some embodiments, the one or more heaters adjacent to or inside the feed channel 1308 are a coil that surrounds the feed channel 1308. The one or more heaters for heating within the feed channel 1308 ensure that the material remains melted and has a proper viscosity under a given applied pressure, to implement predictable flowing. In some embodiments, a printing head 1312 of the device includes one or more heaters 1314, which ensure that the material remains melted and has a proper viscosity inside a nozzle 1316.

In some embodiments, the device includes one or more temperature sensors, which may be located at one or more positions inside the device and can measure the temperature of the material within the device, for example, within the barrel, within the feed channel, or within the printing head. The embodiments illustrated in FIG. 13A to FIG. 13C include a first temperature sensor 1318 adjacent to the feed channel 1308, and a second temperature sensor 1320 adjacent to the printing head 1312. In the figures, the temperature sensor 1318 adjacent to the feed channel 1308 is on one side of the feed channel 1308, but the temperature sensor 1318 may optionally be located anywhere along the length of the feed channel 1308. The temperature sensor 1318 and the one or more heaters (for example, 1310*a* and 1310*b*) may serve as a closed-loop feedback system for the material melted in the feed channel 1308, where the feedback system can ensure that the material within the feed channel remains an approximately constant temperature. For example, the temperature sensor 1318 can transmit a measured temperature to a computer system, and the computer system can operate the one or more heaters 1310*a* and 1310*b* to ensure an approximately constant temperature. The temperature sensor 1320 in the printing head 1312 of the device can operate with the one or more heaters 1314 in the printing head in a closed-loop feedback system, to ensure an approximately constant temperature of the material within the printing head. The feedback system can be operated by using a proportional-integral-derivative (PID) controller, a bang-bang controller, a predictive controller, a fuzzy control system, an expert system controller, or any other suitable algorithm. In some embodiments, the one or more heaters in the device heat the material within the system to a temperature equal to or above the melting temperature of the material. In some embodiments, the one or more heaters heat the material to a temperature of about 60° C. or higher, for example, about 70° C. or higher, about 80° C. or higher, about 100° C. or higher, about 120° C. or higher, about 150° C. or higher, about 200° C. or higher, or about 250° C. or higher. In some embodiments, the one or more heaters heat the material to a temperature of about 300° C. or lower, for example, about 260° C. or lower, about 200° C. or lower, about 150° C. or lower, about 100° C. or lower, or about 80° C. or lower. In some embodiments, the one or more heaters heat the material to different temperatures at different positions of the device. For example, in some embodiments, the material is heated to a first temperature inside the barrel, a second temperature inside the feed channel, and a third temperature inside the printing head, where the temperatures may be same temperatures or different temperatures. By way of example, a material may be heated to 140° C. inside the barrel and the feed channel, but to 160° C. inside the printing head. The feedback control system allows high-precision temperature control. In some embodiments, the temperature is controlled within 0.1° C. of a target temperature, within 0.2° C. of the target temperature, within 0.5° C. of the target temperature, or within 1° C. of the target temperature.

Figure 11:
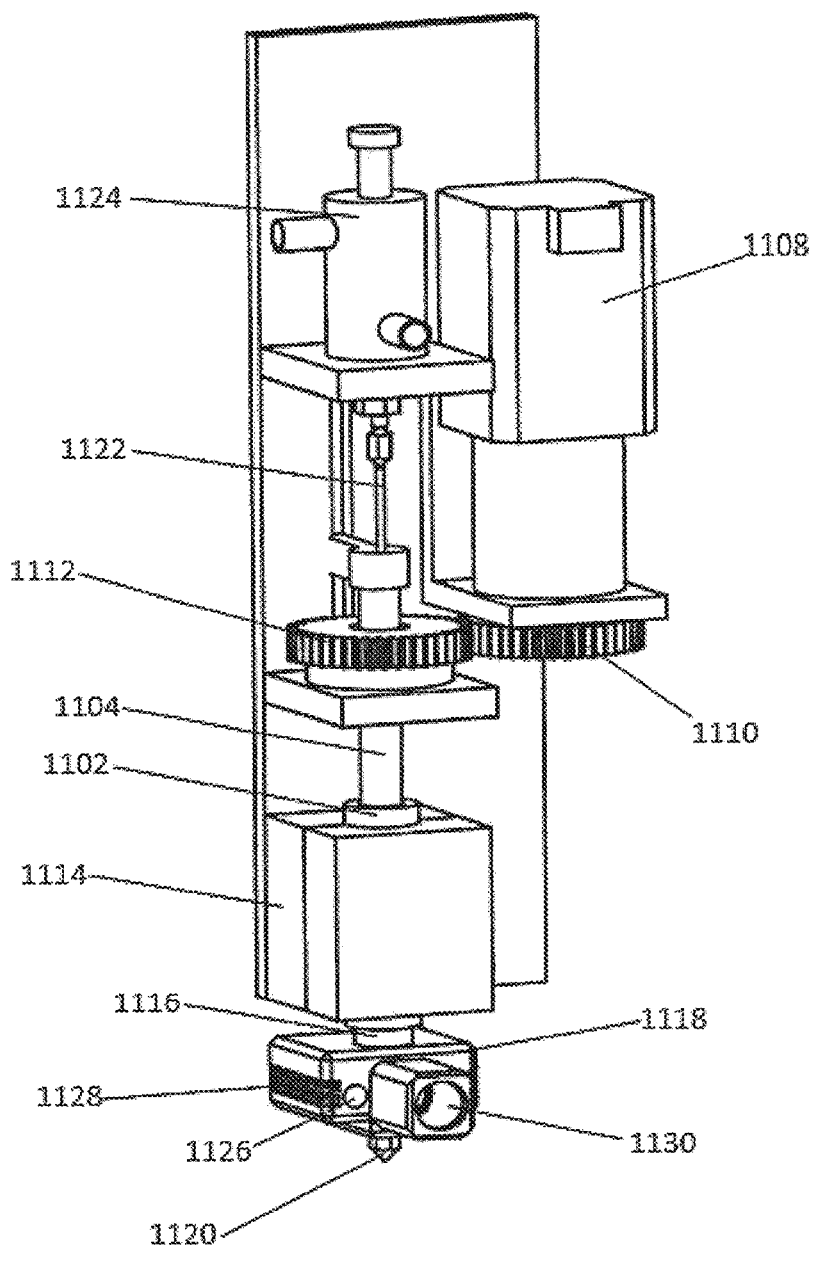
FIG. 11 illustrates a schematic diagram of a 3D printing device according to another embodiment of the present invention.

FIG. 11 illustrates another example of the device according to the present invention. A material is loaded into a barrel 1102 of a printing module, and a pressure screw (or piston) 1104 can apply a pressure to the material in the barrel 1102. To increase the pressure on the material, a pressure controller 1106 (for example, a stepper motor) turns a first gear 1108, and the first gear 1108 turns a second gear 1110 connected to the pressure screw 1104. The material in the barrel 1102 can be heated by a heater 1114 surrounding the barrel 1102. A melted material from inside the barrel 1102 flows through a feed channel 1116 to a printing head 1118 that includes a nozzle 1120. The device may include a pressure sensor 1130, where the pressure sensor 1130 is configured to measure the pressure of the material in the barrel 1102, the feed channel 1116, and/or the printing head 1118. The pressure sensor 1130 can transmit the measured pressure to a computer system, where the computer system can operate the pressure controller 1108 to reposition the pressure screw 1104 and control the pressure of the material within the barrel 1102. This can be operated in a feedback system, where the change of the pressure is then measured by the pressure sensor 1130, and the computer system further operates the pressure controller. The device illustrated in FIG. 11 includes a control switch. The control switch includes a sealing needle 1122 along the same axis as the barrel 1102, and an actuator 1124. The sealing needle 1122 includes an upper end that is connected to the actuator 1124, and a lower tapered end (not shown). The actuator 1124 operates the sealing needle 1122 between an open position (raised) and a closed position (lowered). When the sealing needle 1122 is in the closed position, the tapered end 1122 of the sealing needle 1122 engages with a tapered inner surface of the nozzle 1120 to inhibit flowing of the melted material through the nozzle. The printing head 1118 may further include one or more heaters 1126 and a temperature sensor 1128, which can be operated in a feedback system.

Figure 12:
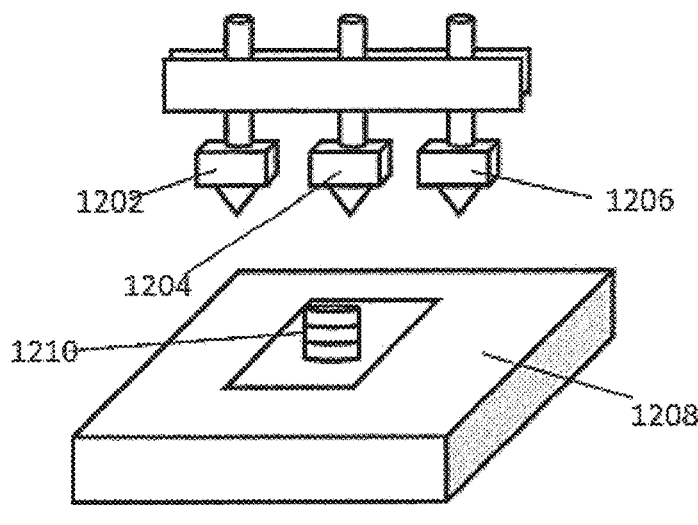
FIG. 12 illustrates a schematic diagram of a 3D printing device according to another embodiment of the present invention.

In some embodiments, there is an additive manufacturing system that includes a plurality (for example, two or more, three or more, four or more, five or more, or six or more) of devices according to the present invention. The devices each include a printing module equipped with a control switch (including a sealing needle with a tapered end operable in an open position and a closed position, and a nozzle). Materials in the independent devices may be the same or different. For example, in some embodiments, the system includes two devices and two different materials (i.e. a first material and a second material). In some embodiments, the system includes three devices and three different materials (i.e. a first material, a second material, and a third material). In some embodiments, the system includes four devices and four different materials (i.e. a first material, a second material, a third material, and a fourth material). In some embodiments, the system includes five devices and five different materials (i.e. a first material, a second material, a third material, a fourth material, and a fifth material). In some embodiments, the system includes six devices and six different materials (i.e. a first material, a second material, a third material, a fourth material, a fifth material, and a sixth material). In some embodiments, the additive manufacturing system includes a first device loaded with a first material and a second device loaded with a second material, where the first material is different from the second material. The different printing modules in the 3D printing system can extrude different materials to form a multi-component printed product, for example, a multi-component pharmaceutical dosage form (such as a pharmaceutical tablet). When one of the printing modules is active (i.e. the sealing needle is in the open position), the other printing modules in the device are inactive (i.e. the sealing needle is in the closed position). The device can quickly switch between active printing modules by coordinating the position of the sealing needle in either the open position or the closed position. FIG. 12 illustrates a portion of an exemplary system that includes three printing modules, each with a distinct printing head 1202, 1204, or 1206. A printing table 1208 is movable on an X-axis, a Y-axis, and a Z axis. A material can be extruded from a correct printing head to manufacture a product 1210 (such as a pharmaceutical tablet).

Figure 3:
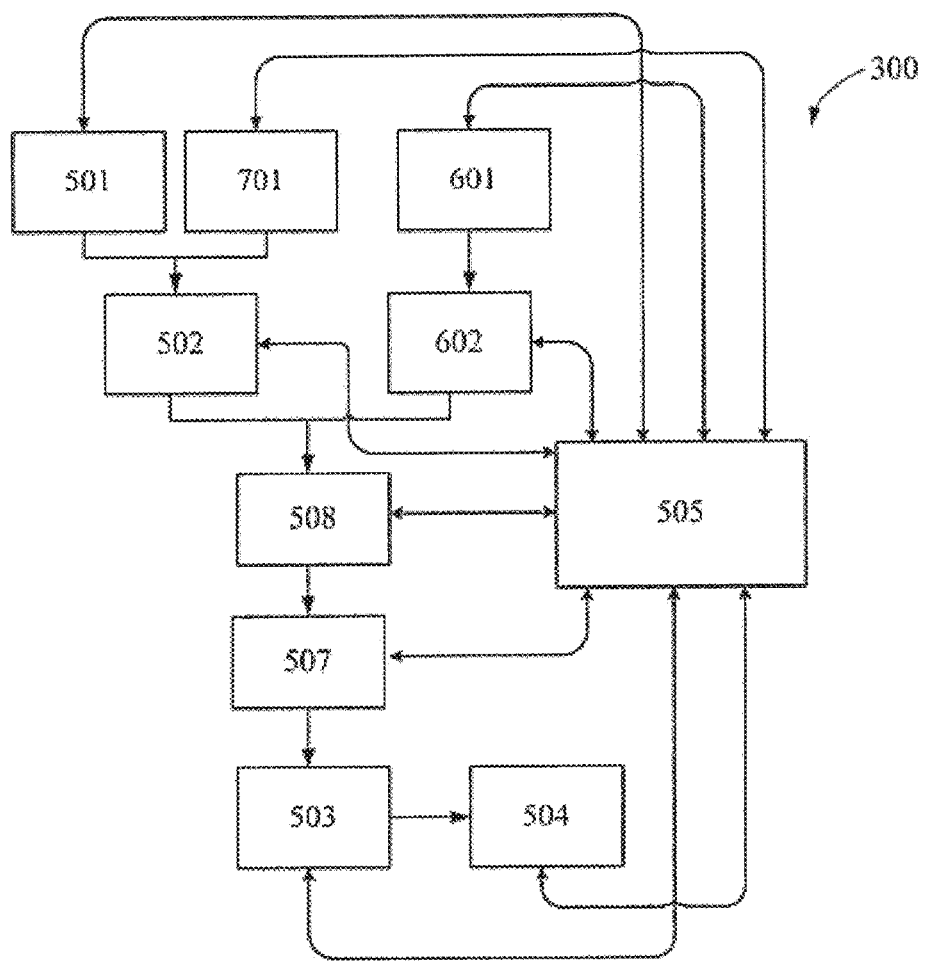
FIG. 3 illustrates a schematic diagram of a 3D printing device according to another embodiment of the present invention.

FIG. 3 illustrates a schematic diagram of a 3D printing device according to a particular embodiment of the present invention.

As shown in FIG. 3, a 3D printing device 300 further includes a control module 505. The control module 505 may be composed of one or more PLC controllers, a single-chip microcomputer, or an electronic computer, and has a computerized user interface. The control module 505 is communicatively connected to a feeding module 501, a melt extrusion module 502, a printing module 503, a platform module 504, a temporary storage module 507, and a mixing module 508 of the 3D printing device 300; and controls specific operation of each module according to a status parameter. The status parameter may include but is not limited to: a numerical model of a product, a melting point of an initial material, a pressure at a nozzle, a quantity of products required, a quantity of products actually obtained, a required composition of the product, required weight of the product, required moisture of the product, and a required quantity of colonies of the product. These parameters may be stored in a digital storage apparatus of an electronic computer of the control module 505, or may be input or selected by a user on a computerized user interface.

In some embodiments, the 3D printing device 300 further includes a plurality of measurement apparatuses disposed in the foregoing modules, configured to obtain, in real time, some specific status parameters monitored at the foregoing modules. The specific status parameter may include the temperature, composition, pressure, weight, moisture, and shape of a melt. In some embodiments, the specific status parameter may be the weight, shape, moisture, and heating temperature of an initial material, and the like. In some embodiments, the specific status parameter may be the composition, pressure, weight, moisture, and shape of a product needing to be printed, and the like. Correspondingly, the measurement apparatuses included in the 3D printing device 300 may be a temperature sensor, a composition sensor, a pressure sensor, a weight sensor, a moisture sensor, and the like.

In some embodiments, the composition sensor may be a near-infrared spectrum analyzer. The near-infrared spectrum analyzer has a probe that can be inserted into a to-be-measured object. The near-infrared spectrum analyzer can obtain specific amounts of various components of a substance through the probe. The near-infrared spectrum analyzer is mainly configured to measure a composition of fluid such as a melt. In some embodiments, the near-infrared spectrum analyzer may further have a probe for measuring a composition of a powdered substance, where the probe can be inserted into an initial material to measure an amount and moisture of a powdered material, and the like. Therefore, in some embodiments, the disposed moisture sensor may alternatively be a near-infrared spectrum analyzer.

In some embodiments, the measurement apparatuses of the 3D printing device 100 shown in FIG. 1 may further include a camera and another imaging apparatus. The camera or imaging apparatus may be configured to measure the feeding module 101, so as to measure, in real time, a parameter such as the shape and size of the initial material that is fed by the feeding module to the melt extrusion module 102, and the discharge speed of the initial material at the discharge outlet 113. The camera or imaging apparatus may be disposed below the feeding module 101 or at the discharge outlet 113. In some embodiments, the camera or imaging apparatus may be further configured to measure the printing module 103 or the platform module 104, and is specifically configured to perform real-time image sensing of a status parameter about a discharge status of the nozzle 131, such as a discharge speed and continuity of discharge; and a status parameter of a product deposited on the deposition platform 141 of the platform module 104, such as a shape, a size, and a curing speed. The camera or imaging apparatus may be disposed on the printing module 103 or the platform module 104, or disposed between the printing module 103 and the platform module 104. Specifically, in some embodiments, the camera or imaging apparatus may be disposed at a position aligned with the nozzle 131, with a plane mirror further disposed at the nozzle 131, where a certain angle exists between a plane on which the plane mirror is located and a plane on which the deposition platform 141 is located, thereby reflecting a light ray that is reflected by the deposition platform 141 to the camera or imaging apparatus. Such arrangement of the camera or imaging apparatus can satisfy a requirement for measuring the foregoing specific status parameter both at the nozzle 131 and at the deposition platform 141.

In some embodiments, a first temperature sensor (not shown in FIG. 3), which is communicatively connected to the control module 505, is disposed in a processing chamber of the melt extrusion module, and is configured to measure the temperature of a melt in the processing chamber of the melt extrusion module 502 and transmit a first temperature measurement signal to the control module 505. The control module 505 determines the temperature of the melt in the processing chamber of the melt extrusion module 502 according to the first temperature measurement signal, and judges whether the temperature is within a first desired temperature range. The temperature of the melt in the processing chamber of the melt extrusion module 502 should be slightly higher than the melting point of the initial material, so as to ensure that the initial material in the processing chamber is sufficiently melted. During practical operation, there is a specific relationship between the first desired temperature range and the structure and composition of a product needing to be printed, and between the first desired temperature range and the type of initial material. Whether the temperature of the melt in the melt extrusion module 502 is within the desired range directly determines viscous fluidity, adhesive properties, and the like of the melt during a printing process, thereby affecting continuity and precision of 3D printing. The control module 505 may determine the first desired temperature range according to the product needing to be printed, or according to a status parameter input by a user on a user interface.

In some embodiments, when the first temperature measurement signal indicates that the temperature of the melt in the processing chamber of the melt extrusion module 502 is lower than the first desired temperature range, the control module 505 may raise heating power of one or more processing chamber heating apparatuses that are disposed in the melt extrusion module 502 for the melt. It should be noted that, because the melt extrusion module 502 generates internal heat during the process of extruding and shearing the initial material, in some embodiments, the control module 505 may alternatively regulate the temperature of the melt in the processing chamber of the melt extrusion module 502 by controlling the extrusion power of the melt extrusion module 502 according to the first temperature measurement signal. On the contrary, when the first temperature measurement signal indicates that the temperature of the melt in the processing chamber is higher than the first desired temperature range, the control module 505 performs reverse operation to stop heating of the one or more processing chamber heating apparatuses that are disposed in the melt extrusion module 502 or reduce their heating power.

In some embodiments, a second temperature sensor (not shown in FIG. 3) is further disposed in the printing module 503, and is configured to measure the temperature of a melt in the printing module and transmit a second temperature measurement signal to the control module 505. The control module 505 controls the temperature of the melt in the printing module 503 within a second desired temperature range according to the second temperature measurement signal. The temperature of the melt in the printing module 503 is of great importance to accuracy and continuity of forming of an ultimate printed product, and is generally set to a value higher than the melting point of the melt. Same as the first desired temperature range, the second desired temperature range is related to the structure and composition of the product needing to be printed, the type of initial material, and the like. The control module 505 may determine the second desired temperature range according to the product needing to be printed, or according to a status parameter input by a user on a user interface.

In some embodiments, when the second temperature measurement signal indicates that the temperature of the melt in the printing module 503 is lower than the second desired temperature range, the control module 505 may raise heating power of a temperature regulating apparatus (not shown FIG. 3) of the printing module 503 for the melt. For details about arrangement and structure of the temperature regulating apparatus, refer to the temperature regulating apparatus 134 of the printing module of the foregoing 3D printing device. When the second temperature measurement signal indicates that the temperature of the melt in the printing module 503 is higher than the second desired temperature range, the control module 505 performs reverse operation to stop the temperature regulating apparatus of the printing module 503 for heating the melt or reduce the heating power of the temperature regulating apparatus. In some embodiments, the temperature of the melt in the printing module 503 can be reduced through the temperature regulating apparatus, so that the temperature of the melt in the printing module 503 remains slightly higher than the melting point of the initial material, to obtain a better product printing effect.

In some embodiments, a third temperature sensor (not shown FIG. 3) is further disposed in the storage chamber of the temporary storage module 507, and is configured to measure the temperature of a melt in a storage chamber of the temporary storage module 507 and transmit a third temperature measurement signal to the control module 505. The control module 505 controls the temperature of the melt in the storage chamber of the temporary storage module 507 within a third desired temperature range according to the third temperature measurement signal. The temperature of the melt in the storage chamber of the temporary storage module 507 should be slightly higher than the melting point of the melt, so as to maintain a melted status of the initial material in the storage chamber. Same as the first desired temperature range, the third desired temperature range is related to the structure and composition of the product needing to be printed, the type of initial material, and the like. The control module 505 may determine the third desired temperature range according to the product needing to be printed, or according to a status parameter input by a user on a user interface.

In some embodiments, when the third temperature measurement signal indicates that the temperature of the melt in the storage chamber is lower than the third desired temperature range, the control module 505 may raise heating power of a storage chamber heating apparatus (not shown FIG. 3) disposed in the storage chamber of the temporary storage module 507 for the melt. The storage chamber heating apparatus disposed in the storage chamber of the temporary storage module 507 has the same structure as the corresponding component of the 3D printing device shown in FIG. 1 or FIG. 2. When the third temperature measurement signal indicates that the temperature of the melt in the storage chamber is higher than the third desired temperature range, the control module 505 performs reverse operation to stop the heating apparatus in the storage chamber of the temporary storage module 507 for heating the melt or reduce the heating power of the heating apparatus.

In some embodiments, a fourth temperature sensor (not shown FIG. 3) is further disposed in a mixing chamber of the mixing module 508, and is configured to measure the temperature of a melt in the mixing chamber of the mixing module 508 and transmit a fourth temperature measurement signal to the control module 505. The control module 505 controls the temperature of the melt in the mixing chamber of the mixing module 508 within a fourth desired temperature range according to the fourth temperature measurement signal. The temperature of the melt in the mixing chamber of the mixing module 508 should be slightly higher than the melting point of the melt, so as to maintain a melted status of the melt in the mixing chamber. Same as the first desired temperature range, the fourth desired temperature range is related to the structure and composition of the product needing to be printed, the type of initial material, and the like. The control module 505 may determine the fourth desired temperature range according to the product needing to be printed, or according to a status parameter input by a user on a user interface.

In some embodiments, when the fourth temperature measurement signal indicates that the temperature of the melt in the mixing chamber is lower than the fourth desired temperature range, the control module 505 may raise heating power of a mixing chamber heating apparatus (not shown FIG. 3) disposed in the mixing chamber of the mixing module 508 for the melt. The mixing chamber heating apparatus disposed in the mixing chamber of the mixing module 508 has the same structure as the corresponding component of the 3D printing device shown in FIG. 1 or FIG. 2. When the fourth temperature measurement signal indicates that the temperature of the melt in the mixing chamber is higher than the fourth desired temperature range, the control module 505 performs reverse operation to stop the heating apparatus in the mixing chamber of the mixing module 508 for heating the melt or reduce the heating power of the heating apparatus.

As shown in FIG. 3 again, in some embodiments, a first pressure sensor (not shown FIG. 3) communicatively connected to the control module 505 is disposed in the printing module 503, and configured to measure the pressure of a melt in the printing module 503 and transmit a first pressure measurement signal to the control module 505. The control module 505 controls the pressure of the melt in the printing module 503 within a first desired pressure range according to the first pressure measurement signal. The magnitude of the pressure of the melt extruded from the printing module of the 3D printing device and stability of the pressure directly affect continuity and precision of 3D printing. Same as the first desired temperature range, the first desired pressure range is related to the structure and composition of the product needing to be printed, the type of initial material, and the like. The control module 505 may determine the first desired pressure range according to the product needing to be printed, or according to a status parameter input by a user on a user interface. In some embodiments, the printing module 503 has a barrel and a nozzle that is disposed below the barrel, where the first pressure sensor is disposed in the barrel of the printing module 503 and is configured to test the pressure of a melt in the barrel. In some other embodiments, the first pressure sensor is disposed in a nozzle of the printing module 503, to precisely measure the pressure of a melt extruded from the nozzle of the printing module. In some embodiments, the first pressure sensor is a piezoelectric pressure sensor, a diffused silicon pressure sensor, a foil gauge pressure sensor, or the like. In some embodiments, the first pressure sensor is a float-type level gauge disposed in a barrel, and the liquid level of a melt in the barrel is judged to determine the pressure of the current melt in the barrel.

In some embodiments, when the pressure of the melt in the nozzle or barrel of the printing module 503 indicated by the first pressure measurement signal is lower than the first desired pressure range, the control module 505 can raise the pressure of the melt in the nozzle or barrel of the printing module 503 by using the foregoing pressure regulating apparatus disposed in the 3D printing device 100. When the first pressure measurement signal indicates that the first pressure measurement signal at the nozzle is higher than the first desired pressure range, the control module 505 performs reverse operation and can reduce the pressure of the melt in the nozzle or barrel of the printing module 503 by using the pressure regulating apparatus disposed in the 3D printing device 100.

As shown in FIG. 3 again, the 3D printing device 300 further includes a feeding module 701, configured to receive an initial material and transmit the initial material to the melt extrusion module 502. The initial material received by the feeding module 701 may be different from the initial material received by the feeding module 501. For example, the feeding module 501 receives a first initial material, but the feeding module 701 receives a second initial material. The melt extrusion module 502 is configured to extrude and heat the first initial material and the second initial material. A first composition detector (not shown in FIG. 3), which is communicatively connected to the control module 505, is disposed at any position of the 3D printing device 300, for example, disposed in the storage chamber of the temporary storage module 507, the mixing chamber of the mixing module 508, or the printing module 503; or in a connection channel between these modules. The first composition detector is configured to measure composition ratios of the first initial material and the second initial material in a melt at any position of the 3D printing device 300, and transmit a first composition measurement signal to the control module 505. The first composition measurement signal may be a near-infrared spectrum analyzer as described previously. The control module 505 determines a composition of the melt at any position of the 3D printing device 300 according to the first composition measurement signal, and judges whether the composition is within a first desired composition range. The composition of the melt of the 3D printing device affects physical and chemical properties of a final product, such as structural strength and disintegration rate. Using 3D printing of pharmaceuticals as an example, the composition of the melt probably affects a release rate of an active ingredient of a final product. Similar to the foregoing desired temperature ranges, the first desired composition range is related to physical and chemical properties of the product needing to be printed, requirements for the strength of the product needing to be printed, the structure and composition of the product needing to be printed, the type of initial material, and the like. The control module 505 may determine the first desired composition range according to the product needing to be printed, or according to a status parameter input by a user on a user interface.

In some embodiments, when the composition ratio indicated by the first composition measurement signal shows that a ratio of the first initial material is slightly high, the control module 505 can reduce the discharge speed of the first initial material or increase the discharge speed of the second initial material by controlling hopper discharge control apparatuses that are disposed in the feeding module 501 and the feeding module 701. Specific structures of the hopper discharge control apparatuses are the same as the structures of corresponding components of the 3D printing device shown in FIG. 1 or FIG. 2. When the composition ratio indicated by the first composition measurement signal shows that the ratio of the first initial material is slightly low, the control module 505 performs reverse operation and can increase the discharge speed of the first initial material or reduce the discharge speed of the second initial material by controlling the hopper discharge control apparatuses disposed in the feeding module 501 and the feeding module 701.

In some embodiments, the 3D printing device 300 further includes a feeding module 601 and a melt extrusion module 602, where the feeding module 601 is configured to receive an initial material and transmit the initial material to the melt extrusion module 602. The initial material received by the feeding module 601 may be different from that received by the feeding module 501 and the feeding module 701. In this way, a melt ultimately extruded by the melt extrusion module 502 and that extruded by the melt extrusion module 602 may be different, for example, a first melt and a second melt respectively. As shown in FIG. 3, the first melt and the second melt are guided into the mixing module 508 for mixing. A second composition detector (not shown in FIG. 3) communicatively connected to the control module 505 is disposed at any position of the 3D printing device 300 behind a discharge outlet of the mixing chamber of the mixing module 508. The composition detector is configured to measure the first melt and the second melt in a mixed melt that is extruded from the discharge outlet of the mixing chamber as well as a ratio of a component included therein, and transmit a second composition measurement signal to the control module 505. The control module 505 determines a composition of a melt from a discharge outlet of the processing chamber of the melt extrusion module 502 according to the second composition measurement signal, and determines whether the composition is within a second desired composition range. Same as the first desired composition range, the second desired composition range is related to physical and chemical properties of the product needing to be printed, requirements for the strength of the product needing to be printed, the structure and composition of the product needing to be printed, the type of initial material, and the like. The control module 505 may determine the second desired composition range according to the product needing to be printed, or according to a status parameter input by a user on a user interface.

In some embodiments, when the composition ratio indicated by the second composition measurement signal shows that a ratio of the first melt or a ratio of a particular component included in the first melt is slightly high, the control module 505 can reduce the discharge speed of the first melt or increase the discharge speed of the second melt by controlling melt extrusion discharge control apparatuses that are disposed in the melt extrusion module 502 and the melt extrusion module 602. Specific structures of the melt discharge control apparatuses are the same as the structures of corresponding components of the 3D printing device shown in FIG. 1 or FIG. 2. When the composition ratio indicated by the second composition measurement signal shows that the ratio of the first melt or the ratio of a particular component included in the first melt is slightly low, the control module 505 performs reverse operation, to increase the discharge speed of the first melt or reduce the discharge speed of the second initial material by controlling the melt extrusion discharge control apparatuses that are disposed in the melt extrusion module 502 and the melt extrusion module 602.

As shown in FIG. 3, the 3D printing device 300 has a temporary storage module 507, where the temporary storage module 507 has a storage chamber that is configured to store a melt extruded from a discharge outlet of the melt extrusion module 502. When a first volume sensor (not shown in FIG. 3) is disposed in the storage chamber of the temporary storage module 507, the first volume sensor is configured to measure a remaining volume of the storage chamber of the temporary storage module 507 and transmit a first volume measurement signal to the control module 505. The control module 505 determines that the material stored in the storage chamber is too much or too little according to the first volume measurement signal, thereby avoiding cases that may affect the pressure of the melt in the 3D printing device 300, for example, a case in which an excessive amount of material is stored in the storage chamber. In some embodiments, the first volume sensor may be a flow meter disposed at a feed inlet of the storage chamber of the temporary storage module 507 and a flow meter disposed at a discharge outlet of the storage chamber of the temporary storage module 507, so that the remaining volume of the storage chamber is determined by respectively calculating an inbound flow volume and an outbound flow volume. The flow meters each may be a differential-pressure, rotor-type, or volumetric flow meter.

Figure 4:
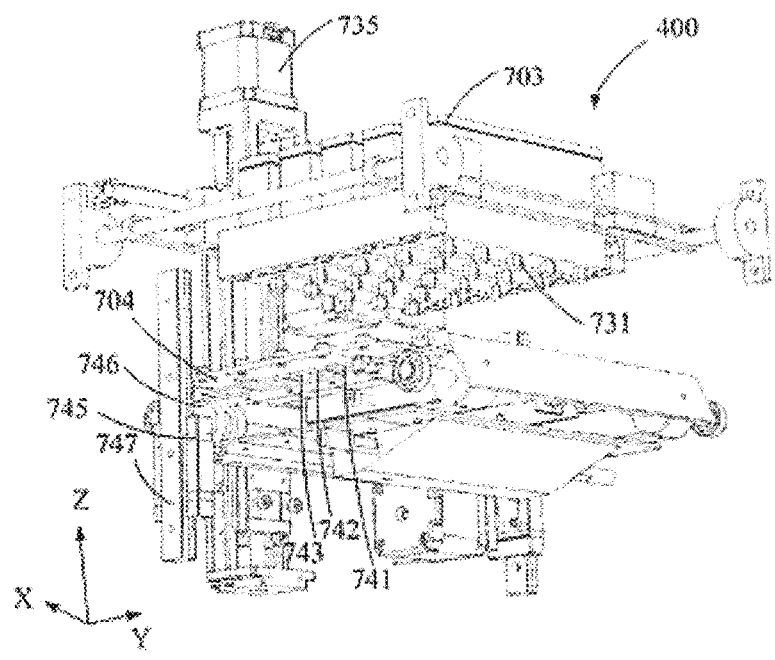
FIG. 4 illustrates a perspective view of a 3D printing device according to a particular embodiment of the present invention.

When the remaining volume of the storage chamber indicated by the first volume measurement signal is too small, the control module 505 can reduce the discharge speed of the corresponding discharge outlet by controlling one or more discharge control apparatuses disposed in the 3D printing device 300, thereby avoiding a case in which an excessive amount of material is stored in the storage chamber. The one or more discharge control apparatuses disposed in the 3D printing device 300 include but are not limited to a hopper discharge control apparatus of the feeding module 501 and a melt extrusion discharge control apparatus of the melt extrusion module 502. Specific structures of the discharge control apparatuses are the same as the structures of corresponding components of the 3D printing device shown in FIG. 1 or FIG. 2. When the remaining volume of the storage chamber indicated by the first volume measurement signal is too large, the control module 505 can increase the discharge speed of the corresponding discharge outlet by controlling the one or more discharge control apparatuses disposed in the 3D printing device 300, thereby improving utilization of the device. FIG. 4 illustrates a perspective view of a 3D printing device according to another embodiment of the present invention. As shown in FIG. 4, a printing module 703 of a 3D printing device 400 includes a plurality of nozzles 731, where the plurality of nozzles 731 are distributed in an array, and lengths of connection paths from each nozzle 731 to the discharge outlet of the processing chamber, the discharge outlet of the mixing chamber or the discharge outlet of the storage chamber are the same, thereby ensuring that each nozzle has an equal pressure during a printing process, to satisfy the demand for batch production. Alternatively, the plurality of nozzles may be arranged in another layout manner in which the lengths of the connection paths from each nozzle to the discharge outlet of the processing chamber, the mixing chamber or the storage chamber are the same, for example, round arrangement or sector-shaped arrangement. The plurality of nozzles 731 of the 3D printing device 400 has a same inner diameter, which is about 0.05 mm to 2 mm, and the nozzles may be made of a material such as steel, brass, or aluminum alloy. In some embodiments, the inner diameter of each nozzle of the 3D printing device 400 is preferably 0.3 mm, 0.4 mm, or 0.5 mm.

In some embodiments, the printing module 703 is connected through a hose (not indicated in FIG. 4) to the processing chamber, the mixing chamber, or the storage chamber. In some embodiments, all modules of the 3D printing device that are connected to each other are connected through hoses, and the foregoing melt flows, through a hose, from the processing chamber of the melt extrusion module into the storage chamber of the temporary storage module, the mixing chamber of the mixing module, or a nozzle of the printing module. In some embodiments, inner diameters of the hoses, through which the modules are connected to each other, are 1 mm to 100 mm. In some embodiments, inner diameters of the hoses, through which the modules are connected to each other, are preferably 4 mm.

Figure 5:
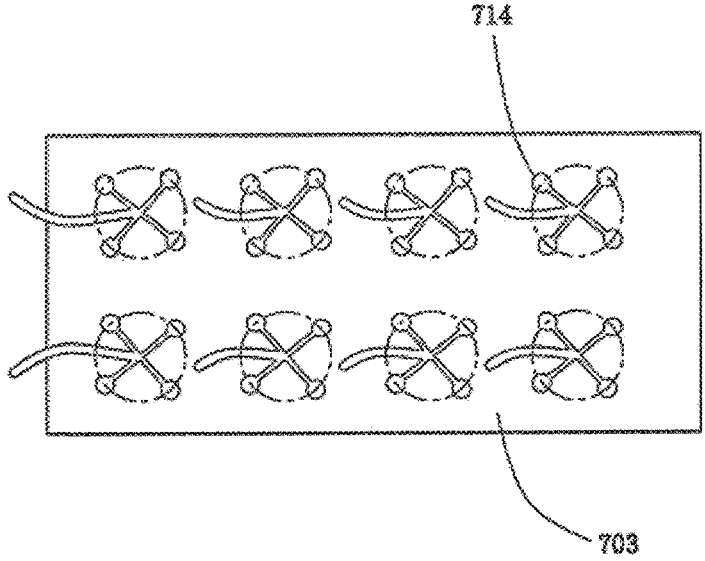
FIG. 5 illustrates a schematic diagram of arrangement of nozzles of a 3D printing device on a printing module according to a particular embodiment of the present invention.

FIG. 5 illustrates a schematic diagram of arrangement of nozzles of a 3D printing device on a printing module according to a particular embodiment of the present invention. As shown in FIG. 5, after being connected to a printing module 703, the hoses enter four nozzles 714, where the four nozzles 714 are located on a same circumference and equally distributed. With such a design, a product ultimately formed through spraying of a nozzle on the platform module can be arranged neatly in both a horizontal direction and a vertical direction, to facilitate a subsequent packaging and cutting process.

As shown in FIG. 4 again, the 3D printing device 400 further includes a platform module 704. The platform module 704 includes a plurality of deposition platforms 741, 742 and 743. The plurality of deposition platforms are disposed on a platform driving mechanism 745. As shown in the figure, the plurality of deposition platforms 741, 742 and 743 are disposed on a crawler-type driving mechanism 746 in a belt connection manner. The crawler-type driving mechanism 746 is disposed on a horizontal driving mechanism 747, and can move horizontally along with the horizontal driving mechanism 747. The crawler-type driving mechanism 746 and the horizontal driving mechanism 747 together form the platform driving mechanism 745. Driven by a motor, the crawler-type driving mechanism 746 can drive the deposition platforms 741, 742 and 743 to move along a Y-axis of a Cartesian coordinate system shown in FIG. 4. The horizontal driving mechanism 747 is a stepper motor, and can drive the deposition platforms 741, 742 and 743 to move along an X-axis of the Cartesian coordinate system shown in FIG. 4. The 3D printing device 400 further includes a printing module driving mechanism 735. As shown in FIG. 4, the printing module driving mechanism 735 is a stepper motor, and can drive the nozzle 731 of the printing module 703 shown in FIG. 4 to move a Z-axis of the Cartesian coordinate system shown in FIG. 4. It should be noted that, structures of the printing module driving mechanism and the platform driving mechanism may be in any combined form to enable the nozzle 731 to move along the X-axis, the Y-axis and the Z-axis of the Cartesian coordinate system relative to the deposition platform. For example, in some embodiments, the printing module driving mechanism drives the nozzle of the printing module to move along the X-axis, the Y-axis and the Z-axis of the Cartesian coordinate system, while the platform module 704 keeps still during a product printing process. It may be understood that, although the printing module driving mechanism 735 and the horizontal driving mechanism 747 shown in FIG. 4 are stepper motors, they may alternatively be other transmission mechanisms, for example, hydraulic piston cylinders.

The 3D printing device 400 may further include a product collection module (not shown in FIG. 4). The product collection module is configured to collect final products formed on the deposition platforms 741, 742, and 743. In some embodiments, the product collection module may be a scraper or manipulator, configured to convey the final products formed on the deposition platforms 741, 742, and 743 to a designated platform or a conveyor belt for packaging. In some embodiments, the product collection module has packaging, laying, and heat sealing functions: A lower layer of package is laid in advance on the platform module, and a product is directly printed on the package; and after the product is ultimately printed, the product collection module directly covers a final product with an upper layer of package, and then pressurization and thermoplastic sealing are performed to finish packaging, where the package may be aluminum foil, plastic membrane, or the like.

In some embodiments, the 3D printing device 400 further has an automatic conveyance mechanism (not shown in FIG. 4), where the automatic conveyance mechanism is directly connected to a feed inlet of a feeding module, and conveys an initial material to the feed inlet. In some embodiments, the automatic conveyance mechanism may be a belt conveyor, a buried scraper conveyer, a vibration conveyor, a screw conveyor, or the like. In some embodiments, the automatic conveyance mechanism may alternatively be equipped with a piezoelectric sensor, configured to measure weight of the conveyed initial material and control quantitative conveying of the initial material according to a measurement result. The control module of the 3D printing device 400 may control the transmission speed of various initial materials according to a status parameter of the device or an instruction input by a user on a user interface, thereby improving production efficiency.

In some embodiments, the 3D printing device 400 further includes an inspection module (not shown in FIG. 4), where the inspection module is configured to measure a product parameter of the final products formed on the platform module. As described previously, a product parameter of a final product include but are not limited to: a quantity of products, a required composition of the product, required weight of the product, required moisture of the product, and a required quantity of bacteria colonies of the product. The inspection module is communicatively connected to the control module, and transmits the measured product parameter to the control module. The control module determines whether the product parameter satisfies an ultimate product requirement according to a predefined product requirement or according to an instruction input by a user on a user interface, determines whether the product is qualified according to a determining result, and takes a corresponding measure to correct unqualified device operation.

In some embodiments, the inspection module may include a near-infrared spectrum analyzer as described previously to measure whether a composition of the final product is qualified. The inspection module may further include a camera, so as to shoot the final product or perform optical inspection on the final product, and make a comparison with standard requirements through the control module, thereby measuring whether a size and a shape of the final product formed on the deposition platforms 741, 742, and 743 conforms to a standard. As described previously, the near-infrared spectrum analyzer may alternatively be used as a moisture sensor. The inspection module may further include a piezoelectric sensor, to measure the weight of the final products. The measured product parameter can be conveyed to the control module, and the control module can automatically regulate the operation of the 3D printing device 400 based on the parameter. For details about a specific regulating manner, refer to the aforesaid regulating apparatuses corresponding to the apparatuses for measuring the status parameter of the control module and various modules that are disposed in the 3D printing device 400, including but not limited to the heating apparatuses and the discharge control apparatuses.

In some embodiments, the 3D printing device 400 further includes an automatic screening module, where the automatic screening module is configured to pick a final product formed on the deposition platforms 741, 742, and 743. In some embodiments, the automatic screening module has a high-precision weighing sensor, such as a piezoelectric sensor, which conveys, based on the weight of products ultimately formed on the automatic screening module, the products to different positions, for example, conveys a product that does not comply with a weight requirement to a position in which scrapped products are placed.

In another aspect of the present invention, a 3D printing method is provided. The 3D printing method includes: melting and pressurizing a material; making the material flow through an extrusion port of a nozzle, where the nozzle includes a tapered inner surface; monitoring the pressure of the material in the nozzle or close to the nozzle; making a tapered end of a sealing needle engage with the tapered inner surface of the nozzle, to seal the extrusion port and inhibit flowing of the melted material; and withdrawing the tapered end of the sealing needle, to resume flowing of the material through the extrusion port. In some embodiments, the method is performed by using the device according to the present invention. In some embodiments, the device includes a plurality of barrels, where each barrel is equipped with a control switch. The method may include: dispensing a first material from a first barrel and dispensing a second material from a second barrel, where a sealing needle of the first barrel is in a closed position when the second material is dispensed from the second barrel, and a sealing needle of the second material supply system is in a closed position when the first material is dispensed from the first barrel. In some embodiments, the method is performed in batches for processing. In some embodiments, the device or system is controlled to work in batches. The term "in batches" refers to a mode of operation in which a predetermined quantity of products (such as pharmaceutical dosage forms) are manufactured. In some embodiments, the method is performed in a continuous mode of operation. In some embodiments, the device or system works in a continuous mode. The term "continuous mode" refers to a mode of operation in which the device or system works for a predetermined period of time or until a predetermined amount of a single type or multiple types of materials have been used.

In some embodiments, the 3D printing method includes: melting and pressurizing a first material; making the first material flow through a first extrusion port of a first nozzle that includes a tapered inner surface; making a tapered end of a first sealing needle engage with the tapered inner surface of the first nozzle, to seal the first extrusion port and inhibit flowing of the melted first material; melting and pressurizing a second material; and withdrawing a tapered end of a second sealing needle from a tapered inner surface of a second nozzle, so that the second material flows through a second extrusion port. In some embodiments, the method includes: receiving an instruction for manufacturing a product, for example, from a computer system.

In some embodiments, a method for manufacturing a pharmaceutical dosage form (such as a tablet) by using the 3D printing method includes the following steps: melting and pressuring a pharmaceutical material; monitoring the pressure of a material within a nozzle or close to the nozzle; making the material flow through an extrusion port of the nozzle that includes a tapered inner surface; making a tapered end of a sealing needle engage with the tapered inner surface of the nozzle, to seal the extrusion port and inhibit flowing of the melted material; and withdrawing the tapered end of the sealing needle, to resume flowing of the material through the extrusion port. In some embodiments, the pharmaceutical material includes a drug. In some embodiments, the method is performed by using the device according to the present invention. In some embodiments, the device includes a plurality of barrels, where each barrel is equipped with a control switch. The method may include: dispensing a first material from a first barrel and dispensing a second material from a second barrel, where a sealing needle of the first barrel is in a closed position when the second material is dispensed from the second barrel, and a sealing needle of the second feeding module is in a closed position when the first material is dispensed from the first barrel. In some embodiments, the method further includes: monitoring the pressure of a first material within a first nozzle or close to the first nozzle; or monitoring the pressure of a second material within a second nozzle or close to the second nozzle.

In some embodiments, a method for manufacturing a pharmaceutical dosage form by using the 3D printing method includes: melting and pressurizing a first pharmaceutical material; making the first pharmaceutical material flow through a first extrusion port of a first nozzle that includes a tapered inner surface; making a tapered end of a first sealing needle engage with the tapered inner surface of the first nozzle, to seal the first extrusion port and inhibit flowing of the melted first material; melting and pressurizing a second pharmaceutical material; and withdrawing a tapered end of a second sealing needle from a tapered inner surface of a second nozzle, so that the second pharmaceutical material flows through a second extrusion port. In some embodiments, the first pharmaceutical material or the second pharmaceutical material is an erodible material. In some embodiments, the first pharmaceutical material or the second pharmaceutical material includes a drug. In some embodiments, the method further includes: receiving an instruction for manufacturing the pharmaceutical dosage form, for example, from a computer system. In some embodiments, the method further includes: monitoring the pressure of the first material within the first nozzle or close to the first nozzle; or monitoring the pressure of the second material within the second nozzle or close to the second nozzle.

Figure 6:
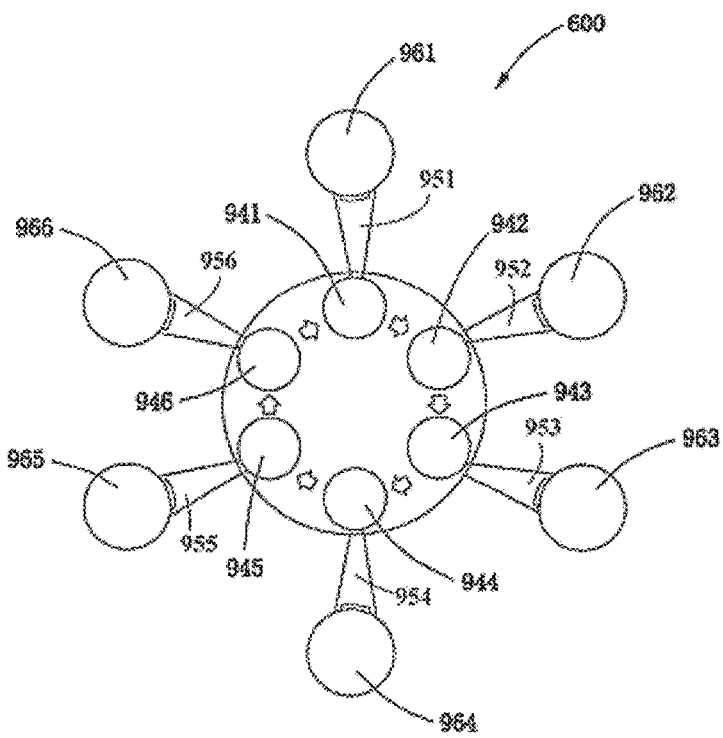
FIG. 6 illustrates a schematic diagram of a 3D printing device according to another embodiment of the present invention.

FIG. 6 illustrates a schematic diagram of a 3D printing device according to another embodiment of the present invention.

Figure 7A:
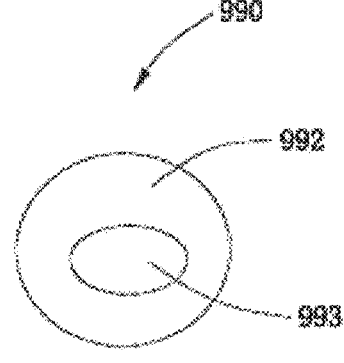
FIG. 7A and FIG. 7B each illustrate a model of a pharmaceutical product that can be printed by using a 3D printing device according to a particular embodiment of the present invention.
Figure 7B:
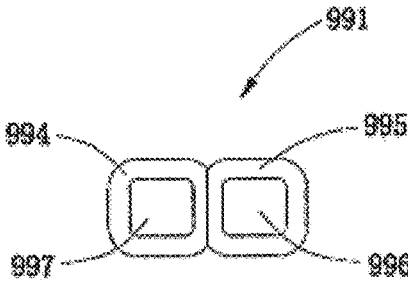

FIG. 7A and FIG. 7B each illustrate a model of a pharmaceutical product that can be printed by using a 3D printing device according to a particular embodiment of the present invention.

The following describes application of the 3D printing device according to the present invention in the field of 3D printing of pharmaceuticals with reference to FIG. 6, FIG. 7A, and FIG. 7B. It may be understood that, the following description is merely an example, and certainly the 3D printing device in the foregoing description is applicable to printing of any other articles that may be obtained through the 3D printing device, for example, artificial skeletons, molds, food, and industrial designs.

As shown in FIG. 6, a 3D printing device 600 includes a plurality of melt extrusion modules 961, 962, 963, 964, 965 and 966, and a plurality of nozzles 951, 952, 953, 954, 955, and 956. For details about structures and function arrangement of the plurality of melt extrusion modules and the plurality of nozzles, refer to the melt extrusion modules and nozzles shown in FIG. 1 and FIG. 2. The 3D printing device 600 further includes a plurality of deposition platforms 941, 942, 943, 944, 945, and 946. For details about structures and function arrangement of the plurality of deposition platforms, refer to the deposition platforms shown in FIG. 1 and FIG. 2. Melts extruded through the plurality of melt extrusion modules of the 3D printing device 600 are deposited on the plurality of deposition platforms. The deposition platforms 941, 942, 943, 944, 945, and 946 can be driven to pass the plurality of nozzles 951, 952, 953, 954, 955, and 956 to receive the melts, and cyclically operate relative to the plurality of nozzles on the whole. In some embodiments, the plurality of deposition platforms may perform reciprocating motion between one or more of the plurality of nozzles, and a detailed description thereof is given later with reference to FIG. 7A and FIG. 7B.

It should be noted that, the 3D printing device 600 shown in FIG. 6 includes a plurality of nozzles 951, 952, 953, 954, 955, and 956, where the nozzles 951, 952, 953, 954, 955, and 956 may be a single nozzle instead, or may be a combination of a plurality of nozzles arranged in a certain manner. In some embodiments, the 3D printing device 600 may have a plurality of printing modules respectively corresponding to the plurality of nozzles 951, 952, 953, 954, 955, and 956. In addition, although not shown in FIG. 6, one or more mixing modules or temporary storage modules may be further disposed between the melt extrusion modules 961, 962, 963, 964, 965 and 966, and the plurality of nozzles 951, 952, 953, 954, 955, and 956 of the 3D printing device 600 shown in FIG. 6. For details about the structure and arrangement of the mixing module(s) or the temporary storage module(s), refer to FIG. 1 and FIG. 2.

FIG. 7A illustrates a model of a drug 990 that can be printed by using a 3D printing device according to a particular embodiment of the present invention. The drug 990 includes a drug shell 992 and a drug kernel 993. The shell 992 may be a capsule made of an enterosoluble or gastric soluble material. The kernel 993 is an active ingredient of the drug. FIG. 7B illustrates a model of a drug 991 that can be printed by using a 3D printing device according to a particular embodiment of the present invention. The drug 991 includes drug shells 994 and 995, and drug kernels 996 and 997. The shells 994 and 995 may be capsules made of enterosoluble or gastric soluble materials with different dissolution and release properties. The kernels 996 and 997 may be different active ingredients of the drug.

In a process of printing the foregoing drug, a control module first reads a digital drug model shown in FIG. 7A or FIG. 7B, a status parameter of the drug such as a composition, moisture, and weight, and requirements on a parameter of a final product. Then the control module controls an automatic conveyance mechanism as described previously to feed a melt extrusion module through a feeding module. Using the drug model shown in FIG. 7A as an example, the melt extrusion module 961 receives an initial material that is an enterosoluble material, and extrudes and heats the initial material, so that the initial material is converted into a melt and the melt is extruded through the nozzle 951. The melt extrusion module 962 is configured to receive an initial material of the active ingredient of the drug, and extrude and heat the initial material, so that the initial material is converted into a melt and the melt is extruded through the nozzle 952. A platform driving mechanism drives the deposition platform 941 to first move to a position below the nozzle 951, so that a lower half concave part of the drug shell 992 is ultimately formed by stratified deposition on the deposition platform 941 through relative motion between the nozzle 951 and the deposition platform 941. Then the platform driving mechanism drives the deposition platform 941 to move to a position below the nozzle 952, and the drug kernel 993 is ultimately formed in the lower half concave part of the drug shell 992 by stratified deposition on the deposition platform 941 through relative motion between the nozzle 952 and the deposition platform 941. Then the deposition platform 941 is driven to return to a position below the nozzle 951, so that an upper half part of the drug shell 992 is ultimately formed by stratified deposition on the deposition platform 941 through relative motion between the nozzle 951 and the deposition platform 941, thereby ultimately forming the drug model shown in FIG. 7A. In some embodiments, the melt extrusion module 963 shown in FIG. 6 may have a same initial material as the melt extrusion module 961, and extrudes and heats the initial material, so that the initial material is converted into a melt and the melt is extruded through the nozzle 953. Therefore, after printing the drug kernel 993, the deposition platform 941 can move to a position below the nozzle 953, to finish printing of the drug model shown in FIG. 7A. It may be understood that, the plurality of deposition platforms 941, 942, 943, 944, 945, and 946 may pass below the nozzles 951, 952, and 953 in turn, to finish printing of the drug model shown in FIG. 7A in a pipeline manner, thereby effectively improving drug printing efficiency and satisfying a mass production requirement. Certainly, in some embodiments, the deposition platform 941 may alternatively perform reciprocating motion between the nozzle 951 and the nozzle 952, to finish printing of the drug model shown in FIG. 7A. Similarly, the deposition platform 942 may perform reciprocating motion between the nozzle 952 and the nozzle 953, to finish printing of the drug model shown in FIG. 7A.

It should be noted that, in some embodiments, stratified printing may be strictly performed for the drug model shown in FIG. 7A. The 3D printing device 600 may stratify the drug model shown in FIG. 7A from top to bottom, and drive the deposition platform 941, through the platform driving mechanism, to first move to a position below the nozzle 951, so that a single stratified portion including only the drug shell 992 is ultimately formed by stratified deposition on the deposition platform 941 through relative motion between the nozzle 951 and the deposition platform 941. When printing a single stratum including both the drug shell 992 and the drug kernel 993, the 3D printing device 600 drives, through the platform driving mechanism, the deposition platform 941 to perform reciprocating motion between a position below the nozzle 951 and a position below the nozzle 952, so that the single stratum including both the drug shell 992 and the drug kernel 993 is ultimately formed by stratified deposition on the deposition platform 941 through relative motion between the nozzles and the deposition platform 941.

A printing manner for the drug model shown in FIG. 7B is similar to that shown in FIG. 7A. First, a lower half concave part of the drug shells 994 and 995 may be dispensed, then a drug kernel part of the kernels 996 and 997 is dispensed, and finally an upper half part of the drug shells 994 and 995 is dispensed. In some embodiments, alternatively the drug model shown in FIG. 7B may be stratified first, to strictly perform stratified printing. In some embodiments, a drug model including a plurality of different components may be printed by using a plurality of different melt extrusion modules and/or printing modules. As shown in FIG. 7B, the drug model 994 may be made of an enterosoluble material, the kernel 997 is an active ingredient that needs to be released in an intestine, the drug model 995 is made of a gastric soluble material, and the kernel 996 is an active ingredient that needs to be released in a stomach. Therefore, the drug model shown in FIG. 7B enables release with different efficiency in different organs, and pharmaceutical products with various special structures and requirements shown in FIG. 7B can be efficiently and quickly printed in batches by using the 3D printing device disclosed herein.

The 3D printing device disclosed herein also meets a continuous manufacturing of pharmaceuticals (CMP) requirement. With the foregoing control module, inspection module, and status parameter measurement apparatuses, the 3D printing device can monitor, in real time, a product parameter or a status parameter of a final product or an intermediate product of a drug needing to be printed, such as a composition, moisture, weight, and shape; and can regulate a product parameter or the status parameter through components such as the foregoing discharge control apparatuses and heating apparatuses, thereby avoiding numerous problems brought by batch production of pharmaceuticals and improving production efficiency.

FIG. 8 illustrates a flowchart of a 3D printing method according to a particular embodiment of the present invention.

The present invention further discloses a 3D printing method for product printing by using the 3D printing device disclosed herein. The following describes in detail the 3D printing method with reference to FIG. 1, FIG. 2, and FIG. 3. For details about implementation of specific functions in specific steps of the method, refer to the arrangement of specific components and functions in the foregoing 3D printing device embodiments of the present invention. The 3D printing method includes: feeding a first initial material to a processing chamber 121 of a melt extrusion module 102 of a 3D printing device 100; heating and extruding the first initial material in the processing chamber 121, so that the first initial material is converted into a first melt and the first melt is extruded from a discharge outlet 125 of the processing chamber 121; and guiding the first melt at the discharge outlet 125 of the processing chamber 121 to be extruded through a nozzle 131 of the printing module 103 and deposited on a platform module 104.

In some embodiments, the 3D printing method further includes: feeding the first initial material to the melt extrusion module 102 through a hopper of a feeding module 101.

In some embodiments, the 3D printing method further includes: measuring the pressure of the first melt in the printing module 103; and controlling the pressure of the first melt in the printing module 103 according to the measured pressure.

In some embodiments of the present invention, the 3D printing method further includes: measuring the temperature of the first hybrid melt in the printing module 103; and regulating the temperature of the first melt in the printing module 103 according to the measured temperature.

In some embodiments, the 3D printing method further includes: measuring the temperature of the first melt in the processing chamber 121; and controlling heating power and/or extrusion power for the first melt in the processing chamber 121 according to the measured temperature.

In some embodiments, the step of guiding the first melt at the discharge outlet of the processing chamber 121 to be extruded through the nozzle 131 of the printing module 103 and deposited on the platform module 104 specifically includes: guiding the first melt at the discharge outlet 125 of the processing chamber 121 to enter a storage chamber 171 of a temporary storage module 107; and guiding the first melt at a discharge outlet of the storage chamber 171 to be extruded through the nozzle 131 of the printing module 103 and deposited on the platform module 104.

In some embodiments, the 3D printing method further includes: measuring the temperature of the first melt in the storage chamber 171; and controlling heating power for the first melt in the storage chamber 171 according to the measured temperature.

In some embodiments, the 3D printing method further includes: measuring a remaining volume of the storage chamber 171; and controlling the discharge speed of the first melt at the discharge outlet 125 of the processing chamber 121 according to the remaining volume of the storage chamber 171.

In some embodiments, the 3D printing method further includes: guiding at least a part of the first melt extruded from the discharge outlet 125 of the processing chamber 121 to flow back to the processing chamber 121.

As shown in FIG. 2, in some embodiments, the 3D printing method further includes: feeding a second initial material to a processing chamber of a second melt extrusion module 402 through a hopper of a second feeding module 401; heating and extruding the second initial material in the processing chamber of the second melt extrusion module 402, so that the second initial material is converted into a second melt and the second melt is extruded from a discharge outlet of the processing chamber of the second melt extrusion module; mixing the first melt and the second melt in a mixing chamber 308, to form a first mixed melt; and guiding the first mixed melt at a discharge outlet of the mixing chamber 308 to be extruded through a nozzle 331 of a printing module 303 and deposited on a platform module 304.

In some embodiments, the 3D printing method further includes: measuring a composition of the first mixed melt extruded from the discharge outlet of the mixing chamber 308; and controlling the discharge speed of the first melt at a discharge outlet of a processing chamber of a first melt extrusion module 302 and the discharge speed of the second melt at the discharge outlet of the processing chamber of the second melt extrusion module 402 respectively according to the measured composition of the first mixed melt.

In some embodiments, the 3D printing method further includes: measuring the temperature of the first mixed melt in the mixing chamber 308; and controlling heating power for the first mixed melt in the mixing chamber 308 according to the measured temperature.

As shown in FIG. 1, in some embodiments, the 3D printing method further includes: feeding a second initial material to the processing chamber 121 of the first melt extrusion module 102 through a hopper 211 of a second feeding module 201; and heating and extruding the first initial material and the second initial material in the processing chamber 121, so that they are converted into a first melt.

In some embodiments, the 3D printing method further includes: measuring a composition of the first melt at any position of the 3D printing device 100, and controlling the discharge speed of the first initial material at a discharge outlet of the first feeding module 101 and the discharge speed of the second initial material at a discharge outlet of the second feeding module 102 respectively according to the measured composition of the first melt.

As shown in FIG. 6, in some embodiments, the 3D printing method further includes: feeding a second initial material to a processing chamber of a second melt extrusion module 962 through a hopper of a second feeding module (not shown in FIG. 6); and heating and extruding the second initial material in the processing chamber of the second melt extrusion module 962, so that the second initial material is converted into a second melt and the second melt is extruded from a discharge outlet of the processing chamber of the second melt extrusion module 962; guiding the second melt at the discharge outlet of the processing chamber of the second melt extrusion module 962 to be extruded through a second nozzle 952 of the printing module and deposited on a platform module 941; and driving the platform module 941 to move between a position below a first nozzle 951 and a position below the second nozzle 952.

As shown in FIG. 4, in some embodiments, the 3D printing method further includes: driving a nozzle 731 of the printing module to move relative to the platform module.

In some embodiments, the 3D printing method further includes: driving the nozzle 731 of the printing module to move along a Z-axis shown in FIG. 4 relative to the platform module.

In some embodiments, the 3D printing method further includes: driving a first deposition platform 741 of the platform module to move relative to the nozzle 731 of the printing module, where the first deposition platform 741 is configured to receive the first melt extruded through the nozzle 731.

In some embodiments, the 3D printing method further includes: driving the deposition platform 741 to move along an X-axis and/or a Y-axis shown in FIG. 4 relative to the nozzle 731.

In some embodiments of the present invention, the 3D printing method further includes: collecting a final product formed on the platform module 104.

In some embodiments of the present invention, the 3D printing method further includes: measuring a product parameter of a final product formed on the platform module 104.

In some embodiments of the present invention, the 3D printing method further includes: picking a final product formed on the platform module 104.

In some embodiments, the 3D printing method further includes: conveying the first initial material to the feeding module 101 through an automatic conveyance module.

In some embodiments, the 3D printing method may be used for dispensing a thermoplastic material, especially in scenarios such as continuous production, individualized production, and batch production of pharmaceuticals.

It should be noted that, although the several modules or sub-modules of the 3D printing device are mentioned in detail in the foregoing detailed description, such division is merely an example but not mandatory. In fact, features and functions of two or more of the foregoing modules according to the embodiments of the present application may be integrated into one module during specific implementation. On the contrary, features and functions of one module in the foregoing modules may be further divided into a plurality of modules during specific implementation.

Persons of ordinary skill in the art may understand and implement other variations to the disclosed embodiments by studying this specification, the disclosed content, the accompanying drawings, and the appended claims. In the claims, the term "comprising" does not exclude other elements and steps, and the terms "one" and "a" do not exclude plurality. During practical application of the present application, one spare part may perform functions that integrate a plurality of technical features quoted in the claims. The accompanying drawing reference signs shall not be construed as limiting the scope of the present invention.

The foregoing is an exemplary description of various embodiments of the present application with reference to the accompanying drawings. Persons skilled in the art may be easily aware that, in combination with the content disclosed in this specification, various components of the 3D printing device disclosed in various embodiments may be appropriately regulated or recombined according to actual needs, without departing from the spirit of the present invention. The protection scope of the present application shall be subject to the protection scope of the claims.

The invention claimed is:

1. A 3D printing system for printing pharmaceutical dosage forms based on a digital drug model, comprising:
a first printing module;
a first melt extrusion module connected to the first printing module;
a second printing module;
a second melt extrusion module connected to the second printing module;
a control module;
a deposition platform;
a platform driving mechanism, and
an inspection module;
wherein the first melt extrusion module comprises a first processing chamber having a feed inlet and a discharge outlet,
wherein the first melt extrusion module is configured to receive a first initial material through the feed inlet of the first processing chamber and heat and extrude the first initial material, so that the first initial material is converted into a first melt and the first melt is extruded from the discharge outlet of the first processing chamber,
wherein the first printing module is connected to the discharge outlet of the first processing chamber,
wherein the first printing module comprises a first group of nozzles,
wherein the first printing module is configured to receive the first melt extruded from the discharge outlet of the first processing chamber,
wherein the second melt extrusion module comprises a second processing chamber having a feed inlet and a discharge outlet,
wherein the second melt extrusion module is configured to receive a second initial material through the feed inlet of the second processing chamber and heat and extrude the second initial material, so that the second initial material is converted into a second melt and the second melt is extruded from the discharge outlet of the second processing chamber,
wherein the second printing module is connected to the discharge outlet of the second processing chamber,
wherein the second printing module comprises a second group of nozzles,
wherein the second printing module is configured to receive the second melt extruded from the discharge outlet of the second processing chamber,
wherein the first initial material comprises an active ingredient of a drug,
wherein the control module is configured to:
generate one or more control commands based on the digital drug model for controlling the 3D printing system,
in accordance with a determination that a ratio of the active ingredient and an excipient of the drug exceeds a first threshold, generate the one or more control commands to decrease a discharge speed of the first initial material, or to increase a discharge speed of the second initial material, and
in accordance with a determination that the ratio of the active ingredient and the excipient is below a second threshold, generate the one or more control commands to increase the discharge speed of the first initial material, or to decrease the discharge speed of the second initial material,
wherein the platform driving mechanism is configured to drive the deposition platform to move between a position below the first group of nozzles and a position below the second group of nozzles based on the one or more control commands,
wherein the first printing module is configured to, when the deposition platform is moved below the first group of nozzles, open the first group of nozzles to extrude the first melt to form a first portion of the pharmaceutical dosage forms on the deposition platform,
wherein the second printing module is configured to, when the deposition platform is moved below the second group of nozzles, open the second group of nozzles to extrude the second melt to form a second portion of the pharmaceutical dosage forms on the deposition platform,
wherein the inspection module is configured to measure one or more parameters of the pharmaceutical dosage forms, and the one or more control commands are generated further based on the one or more measured parameters.

2. The 3D printing system of claim 1, wherein the first melt extrusion module further comprises a first processing chamber heating apparatus disposed in the first processing chamber, wherein second melt extrusion module further comprises a second processing chamber heating apparatus disposed in the second processing chamber, wherein the first processing chamber heating apparatus is communicatively connected with the control module and wherein the control module controls heating power of the first processing chamber heating apparatus, and wherein the second processing chamber heating apparatus is communicatively connected with the control module and wherein the control module controls heating power of the second processing chamber heating apparatus.

3. The 3D printing system of claim 2, further comprising: a first temperature measurement apparatus communicatively connected to the control module and a second temperature measurement apparatus communicatively connected to the control module, wherein the first temperature measurement apparatus is configured to measure the temperature of the first melt in the first processing chamber and transmit a first temperature measurement signal to the control module, wherein the second temperature measurement apparatus is configured to measure the temperature of the second melt in the second processing chamber and transmit a second temperature measurement signal to the control module, and wherein the control module is configured to control heating power of the first processing chamber heating apparatus according to the first temperature measurement signal and control heating power of the second processing chamber heating apparatus according to the second temperature measurement signal.

4. The 3D printing system of claim 1, further comprising: a first feeding module, wherein the first feeding module comprises a first hopper, and the first hopper has a feed inlet and a discharge outlet, and is configured to receive the active ingredient through the feed inlet of the first hopper and discharge the active ingredient to the feed inlet of the first processing chamber through the discharge outlet of the first hopper;

a second feeding module, wherein the second feeding module comprises a second hopper, and the second hopper has a feed inlet and a discharge outlet, and is configured to receive the excipient of the drug through the feed inlet of the second hopper and discharge the excipient to the feed inlet of the second processing chamber through the discharge outlet of the second hopper;

wherein the first melt extrusion module is configured to mix and heat the active ingredient and the excipient to obtain the first melt.

5. The 3D printing system of claim 4, wherein the first feeding module further comprises a first hopper discharge control apparatus, and the first hopper discharge control apparatus is configured to control the discharge speed of the first initial material at the discharge outlet of the first hopper, and wherein the second feeding module further comprises a second hopper discharge control apparatus, and the second hopper discharge control apparatus is configured to control the discharge speed of the second initial material at the discharge outlet of the second hopper.

6. The 3D printing system of claim 5, further comprising a composition measurement apparatus, wherein the composition measurement apparatus is communicatively connected to the control module, and configured to measure the ratio of the active ingredient and the excipient of the first melt and transmit a composition measurement signal to the control module, wherein the control module is configured to control the first hopper discharge control apparatus and/or the second hopper discharge control apparatus based on the composition measurement signal.

7. The 3D printing system of claim 6, wherein:

the composition measurement signal indicates whether the ratio of the active ingredient and the excipient of the drug exceeds the first threshold or is below the second threshold, the discharge speed of the first initial material is decreased or increased at the discharge outlet of the first hopper, and the discharge speed of the second initial material is increased or decreased at the discharge outlet of the second hopper.

8. The 3D printing system of claim 1, wherein the digital drug model comprises a drug shell and a drug kernel, wherein the first portion of the pharmaceutical dosage forms comprises drug kernels and comprises the active ingredient, and wherein the second portion of the pharmaceutical dosage forms comprises drug shells and comprises materials with different dissolution and release properties.

9. The 3D printing system of claim 1, wherein the first melt extrusion module comprises a first melt extrusion apparatus in the first processing chamber, wherein the second melt extrusion module comprises a second melt extrusion apparatus in the second processing chamber, wherein the first melt extrusion apparatus is communicatively connected to the control module and the control module is configured to control extrusion power of the first melt extrusion apparatus, and wherein the second melt extrusion apparatus is communicatively connected to the control module and the control module is configured to control extrusion power of the second melt extrusion apparatus.

10. The 3D printing system of claim 1, wherein each of the first group of nozzles and the second group of nozzles comprises a single nozzle.

11. The 3D printing system of claim 1, wherein the first group of nozzles comprises a first plurality of nozzles arranged in an array, and wherein the second group of nozzles comprises a second plurality of nozzles having the same count and the same layout as the first plurality of nozzles.

12. The 3D printing system of claim 11, wherein a length of a connection path from each nozzle of the first group of nozzles to the discharge outlet of the first processing chamber is equal, and wherein a length of a connection path from each nozzle of the second group of nozzles to the discharge outlet of the second processing chamber is equal.

13. The 3D printing system of claim 1, wherein the first printing module further comprises a first control switch configured to open or close the first group of nozzles based on the one or more control commands, and wherein the second printing module further comprises a second control switch configured to open or close the second group of nozzles based on the one or more control commands.

14. The 3D printing system of claim 13, wherein each of the first control switch and the second control switch comprises a sealing needle.

15. The 3D printing system of claim 1, wherein the one or more parameters comprise one or more of moisture and bacteria colony quantity.

\* \* \* \* \*